(12) United States Patent
Zhu et al.

(10) Patent No.: US 11,368,255 B2
(45) Date of Patent: Jun. 21, 2022

(54) HYBRID AUTOMATIC REPEAT REQUEST RESULT FEEDBACK METHOD AND DEVICE

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Can Li, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 262 days.

(21) Appl. No.: 16/632,876

(22) PCT Filed: Jul. 28, 2017

(86) PCT No.: PCT/CN2017/094964
§ 371 (c)(1),
(2) Date: Jan. 22, 2020

(87) PCT Pub. No.: WO2019/019171
PCT Pub. Date: Jan. 31, 2019

(65) Prior Publication Data
US 2020/0213042 A1    Jul. 2, 2020

(51) Int. Cl.
*H04W 76/27*    (2018.01)
*H04W 72/04*    (2009.01)
(Continued)

(52) U.S. Cl.
CPC .......... *H04L 1/1812* (2013.01); *H04L 1/0061* (2013.01); *H04L 1/1806* (2013.01);
(Continued)

(58) Field of Classification Search
None
See application file for complete search history.

(56) References Cited

U.S. PATENT DOCUMENTS 8,693,383 B2 * 4/2014 Damnjanovic ....... H04L 5/0048
370/315
9,531,506 B2   12/2016 Kim
(Continued)

FOREIGN PATENT DOCUMENTS

CN    101998584 A    3/2011
CN    102215093 A    10/2011
(Continued)

OTHER PUBLICATIONS

Mikio Iwamura, etc., Carrier aggregation framework in 3GPP LTE-advanced [WiMAX/LTE Update], IEEE Communications Magazine, No. 8, vol. 48, Aug. 3, 2010 (Aug. 3, 2010), p. 60-67.
(Continued)

*Primary Examiner* — Edan Orgad
*Assistant Examiner* — Emmanuel K Maglo
(74) *Attorney, Agent, or Firm* — Syncoda LLC; Feng Ma

(57) ABSTRACT

A method for feeding back a HARQ result includes that: a mapping relationship between each downlink carrier group and each uplink carrier group is determined; a target manner for acquiring a target uplink carrier from the each uplink carrier group is determined; and the mapping relationship and the target manner are sent to the terminal to enable the terminal to feed back a target HARQ result through the
(Continued)

target uplink carrier after determining the target uplink carrier in a present uplink carrier group according to the target manner.

18 Claims, 25 Drawing Sheets

(51) Int. Cl.
  *H04W 74/08* (2009.01)
  *H04L 1/18* (2006.01)
  *H04L 1/00* (2006.01)
  *H04W 80/02* (2009.01)

(52) U.S. Cl.
  CPC ....... *H04L 1/1854* (2013.01); *H04W 72/0413* (2013.01); *H04W 74/0808* (2013.01); *H04W 76/27* (2018.02); *H04W 80/02* (2013.01)

(56) References Cited

U.S. PATENT DOCUMENTS

| | | | |
|---|---|---|---|
| 9,723,576 | B2 | 8/2017 | Gao et al. |
| 2009/0046770 | A1* | 2/2009 | Zhou .................. H04M 11/062 375/222 |
| 2010/0323744 | A1* | 12/2010 | Kim .................. H04W 52/242 455/522 |
| 2011/0243012 | A1 | 10/2011 | Luo |
| 2012/0218963 | A1 | 8/2012 | Kim |
| 2015/0289257 | A1 | 10/2015 | Luo et al. |
| 2015/0358927 | A1* | 12/2015 | Gao .................. H04W 72/0413 370/329 |
| 2017/0070318 | A1 | 3/2017 | Kim et al. |
| 2019/0132837 | A1* | 5/2019 | Yi .................. H04W 72/0413 |

FOREIGN PATENT DOCUMENTS

| | | |
|---|---|---|
| CN | 102656934 A | 9/2012 |
| CN | 102938680 A | 2/2013 |
| CN | 103929800 A | 7/2014 |
| CN | 103974319 A | 8/2014 |
| CN | 105991260 A | 10/2016 |
| EP | 2408247 A1 | 1/2012 |
| EP | 2485425 A2 | 8/2012 |
| EP | 2782289 A2 | 9/2014 |
| EP | 3125459 A1 | 2/2017 |

OTHER PUBLICATIONS

First Office Action of the Chinese application No. 201780000742.6, dated Dec. 28, 2020.
Yang Hong-wen,etc.,"ACK Based Scheduling Algorithm for 1×EV-DV",Journal of Beijing University of Posts and Telecommunications,vol. 27 No.5,2004(12).
Notice of Allowance of the Chinese application No. 201780000742.6, dated Jun. 3, 2021.
International Search Report in the international application No. PCT/CN2017/094964, dated Apr. 18, 2018.
English translation of the Written Opinion of the International Search Authority in the international application No. PCT/CN2017/094964, dated Apr. 18, 2018.
3Rd Generation Partnership Project; Technical Specification Group Radio Access Network; Scenarios and Requirements for Next Generation Access Technologies; (3GPP name for next generation radio access); (Release 14) 3GPP TR 38.913 V0.0.2 (Jan. 2016).
3Rd Generation Partnership Project; Technical Specification Group Radio Access Network; Study on Licensed-Assisted Access to Unlicensed Spectrum; (Release 13) 3GPP TR 36.889 V0.0.2 (Oct. 2014).
3Rd Generation Partnership Project; Technical Specification Group Radio Access Network; Evolved Universal Terrestrial Radio Access Network (E-UTRAN); Extension of Dual Connectivity in EUTRAN (Release 13) 3GPP TR 36.875 V1.1.0(Apr. 2015).
"RAN1 Chairman's Notes", 3GPP TSG RAN WG1 Meeting #88 Athens, Greece Feb. 13-17, 2017.
"Final Report of 3GPP TSG RAN WG1 #83 v1.0.0 (Anaheim, USA, Nov. 15-22, 2015)", 3GPP TSG RAN WG1 Meeting #84 R1-160236 St Julian's, Malta, Feb. 15-19, 2016.
Supplementary European Search Report in the European application No. 17918788.5, dated Jun. 23, 2020.

* cited by examiner

HYBRID AUTOMATIC REPEAT REQUEST RESULT FEEDBACK METHOD AND DEVICE

CROSS-REFERENCE TO RELATED APPLICATION

The present application is a national stage of International Application No. PCT/CN2017/094964 filed on Jul. 28, 2017, the disclosure of which is hereby incorporated by reference in its entirety.

TECHNICAL FIELD

The present disclosure generally relates to the technical field of communications, and more particularly, to a method and device for feeding back a Hybrid Automatic Repeat reQuest (HARQ) result.

BACKGROUND

HARQ is important means for eliminating influence of time variation and multipath fading from a wireless mobile channel on signal transmission in a Long-Term Evolution (LTE) system. A feedback about a downlink HARQ result is a feedback from a terminal to a Physical Downlink Shared Channel (PDSCH) and is for notifying a base station whether the PDSCH is successfully decoded or not.

In a Carrier Aggregation (CA) scenario, a Physical Uplink Control Channel (PUCCH) can only be transmitted in a master cell corresponding to a terminal, and thus a terminal can transmit only one PUCCH in one subframe. This means that HARQ results associated with downlink data sent by multiple downlink component carriers are required to be sent on the same uplink component carrier.

For improving transmission reliability of uplink control information, a terminal may add a Cyclic Redundancy Check (CRC) bit to a new PUCCH format before channel coding is implemented, and CRC may be performed on received PUCCH information on a base station side. A channel situation change may cause an information transmission error of a PUCCH to further cause a PUCCH CRC failure, and in such case, a base station cannot receive a HARQ result fed back by a terminal on the PUCCH and data on all carriers related to feedback information is required to be retransmitted. Consequently, transmission resources are greatly wasted, and system performance is degraded.

In addition, a License Assisted Access (LAA) technology is standardized in 3rd Generation Partnership Project (3GPP) Release 13. LAA is one of key technologies for solving a problem about LTE network expansion by use of an unauthorized spectrum. Enhanced LAA (eLAA) is standardized in 3GPP Release 14. However, there are many limitations on deployment of LTE in an unauthorized spectrum, and the first problem to be considered is how to coexist with another system friendly. Therefore, it is specified that a Listen Before Talk (LBT) operation may be executed before data transmission, namely Channel Clear Assessment (CCA) is performed before data transmission to determine an available state of a channel to avoid interference to another system. That is, for an LAA system, data cannot be transmitted because of an LBT failure, namely availability of an unauthorized carrier is uncertain.

Therefore, when Dual Connectivity (DC) is implemented between an LTE system and an LAA system, there may be a problem that downlink data on all downlink carriers corresponding to a PUCCH is retransmitted because of a CRC failure, and in addition, there may exist another problem that is uncertainty of channel availability of an unauthorized spectrum caused by an LBT failure. From the above, in a related art, when DC is implemented between an LTE system and an LAA system, the reliability of a feedback on a HARQ result through a PUCCH in the LAA system is relatively low.

SUMMARY

For solving the problem in the related art, embodiments of the present disclosure provide a method and device for feeding back a HARQ result.

According to a first aspect of the embodiments of the present disclosure, a method for feeding back a HARQ result is provided, which may be applied to a base station and include that:

a mapping relationship between each downlink carrier group and each uplink carrier group is determined, each downlink carrier group including at least one downlink carrier and each uplink carrier group including at least one uplink carrier;

a target manner for acquiring a target uplink carrier from the each uplink carrier group is determined, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and the mapping relationship and the target manner are sent to a terminal to enable the terminal to feed back the target HARQ result through the target uplink carrier after determining the target uplink carrier in the present uplink carrier group according to the target manner.

Optionally, the operation that the mapping relationship between the each downlink carrier group and the each uplink carrier group is determined may include that:

all downlink carriers are grouped to obtain multiple downlink carrier groups;

all uplink carriers are grouped to obtain multiple uplink carrier groups; and the mapping relationship between the each downlink carrier group and the each uplink carrier group is established.

Optionally, the operation that all the downlink carriers are grouped to obtain the multiple downlink carrier groups may include that:

when a total number of all the downlink carriers exceeds a first threshold, all the downlink carriers are divided into a target number of first downlink carrier groups, any two first downlink carrier groups including different downlink carriers and the target number being the number of PUCCHs supported by the terminal;

when the total number of all the downlink carriers is less than a second threshold, all the downlink carriers are divided into a same group to obtain a second downlink carrier group, the first threshold being greater than the second threshold; and when the total number of all the downlink carriers ranges from the second threshold to the first threshold, all the downlink carriers are divided into a target number of third downlink carrier groups, the downlink carrier configured to carry target data with priority higher than predetermined priority belonging to at least two third downlink carrier groups.

Optionally, the operation that all the uplink carriers are grouped to obtain the multiple uplink carrier groups may include that:

all the uplink carriers are grouped to obtain a target number of uplink carrier groups, any two uplink carrier groups including different uplink carriers and the target number being the number of PUCCHs supported by the terminal.

Optionally, the operation that the mapping relationship between each downlink carrier group and each uplink carrier group is established may include that:

when a group number of the downlink carrier groups is the target number, the mapping relationship that the each downlink carrier group corresponds to the each uplink carrier group one to one is established; and when the group number of the downlink carrier groups is 1, the mapping relationship that a downlink carrier group corresponds to the each uplink carrier group is established.

Optionally, the target manner may include that:

an uplink carrier with highest channel quality in an idle channel in the each uplink carrier group is determined as the target uplink carrier; or an uplink carrier is selected from the each uplink carrier group as the target uplink carrier according to a sequence that is notified through signaling or is predefined.

Optionally, the operation that the mapping relationship and the target manner are sent to the terminal may include that:

the mapping relationship and the target manner are sent to the terminal through target signaling, the target signaling including at least one of:

Radio Resource Control (RRC) signaling, system information, a Media Access Control (MAC) Control Element (CE) and physical-layer signaling.

According to a second aspect of the embodiments of the present disclosure, a method for feeding back a HARQ result is provided, which may be applied to a terminal and include that:

a mapping relationship and a target manner are received from a base station, the mapping relationship being a mapping relationship between each downlink carrier group and each uplink carrier group and the target manner being a manner for acquiring a target uplink carrier from the each uplink carrier group;

the target uplink carrier in a present uplink carrier group is determined according to the target manner; and a target HARQ result is fed back through the target uplink carrier, the each downlink carrier group includes at least one downlink carrier, the each uplink carrier group includes at least one uplink carrier, the target uplink carrier is an uplink carrier configured to carry the target HARQ result in the present uplink carrier group and the target HARQ result includes HARQ results of downlink data carried on all the downlink carriers in a downlink carrier group corresponding to the present uplink carrier group.

Optionally, the target manner may include that:

an uplink carrier with highest channel quality in an idle channel in the each uplink carrier group is determined as the target uplink carrier; or an uplink carrier is selected from the each uplink carrier group as the target uplink carrier according to a sequence that is notified through signaling or is predefined.

Optionally, the operation that the target uplink carrier in the present uplink carrier group is determined according to the target manner may include that:

in a case that the target manner is that the uplink carrier with the highest channel quality in the idle channel in the each uplink carrier group is determined as the target uplink carrier, LBT is performed on the each uplink carrier in the present uplink carrier group to obtain an LBT result; and the uplink carrier with the highest channel quality in the idle channel is selected from the present uplink carrier group as the target uplink carrier according to the LBT result.

Optionally, the operation that the target uplink carrier in the present uplink carrier group is determined according to the target manner may include that:

in a case that the target manner is that the uplink carrier is selected from the each uplink carrier group as the target uplink carrier according to the sequence that is notified through the signaling or is predefined, all the uplink carriers in the present uplink carrier group are numbered according to a sequence from smallest to largest; and the first uplink carrier of which the LBT result is success is determined as the target uplink carrier according to numbers of all the uplink carriers.

According to a third aspect of the embodiments of the present disclosure, a device for feeding back a HARQ result is provided, which may be applied to a base station and include:

a first determination module, configured to determine a mapping relationship between each downlink carrier group and each uplink carrier group, each downlink carrier group including at least one downlink carrier and each uplink carrier group including at least one uplink carrier;

a second determination module, configured to determine a target manner for acquiring a target uplink carrier from the each uplink carrier group, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and a sending module, configured to send the mapping relationship and the target manner to a terminal to enable the terminal to feed back the target HARQ result through the target uplink carrier after determining the target uplink carrier in the present uplink carrier group according to the target manner.

Optionally, the first determination module may include:

a first grouping submodule, configured to group all downlink carriers to obtain multiple downlink carrier groups;

a second grouping submodule, configured to group all uplink carriers to obtain multiple uplink carrier groups; and a mapping relationship establishment submodule, configured to establish the mapping relationship between the each downlink carrier group and the each uplink carrier group.

Optionally, the first grouping submodule may include:

a first grouping unit, configured to, when a total number of all the downlink carriers exceeds a first threshold, divide all the downlink carriers into a target number of first downlink carrier groups, any two first downlink carrier groups including different downlink carriers and the target number is the number of PUCCHs supported by the terminal;

a second grouping unit, configured to, when the total number of all the downlink carriers is less than a second threshold, divide all the downlink carriers into a same group to obtain a second downlink carrier group, the first threshold being greater than the second threshold; and a third grouping unit, configured to, when the total number of all the downlink carriers ranges from the second threshold to the first threshold, divide all the downlink carriers into the target number of third downlink carrier groups, a downlink carrier configured to carry target data with priority higher than predetermined priority belonging to at least two third downlink carrier groups.

Optionally, the second grouping submodule may include:

a fourth grouping unit, configured to group all the uplink carriers to obtain a target number of uplink carrier groups, any two uplink carrier groups including different uplink carriers and the target number being the number of PUCCHs supported by the terminal.

Optionally, the mapping relationship establishment submodule may include:

a first establishment unit, configured to, when a group number of the downlink carrier groups is the target number, establish the mapping relationship that the each downlink carrier group corresponds to the each uplink carrier group one to one; and a second establishment unit, configured to, when the group number of the downlink carrier groups is 1, establish the mapping relationship that the downlink carrier group corresponds to the each uplink carrier group.

Optionally, the target manner may include that:

an uplink carrier with highest channel quality in an idle channel in each uplink carrier group is determined as the target uplink carrier; or an uplink carrier is selected from the each uplink carrier group as the target uplink carrier according to a sequence that is notified through signaling or is predefined.

Optionally, the sending module may include:

a sending submodule, configured to send the mapping relationship and the target manner to the terminal through target signaling, the target signaling including at least one of:

RRC signaling, system information, a MAC CE and physical-layer signaling.

According to a fourth aspect of the embodiments of the present disclosure, a device for feeding back a HARQ result is provided, which may be applied to a terminal and include:

a receiving module, configured to receive a mapping relationship and a target manner from a base station, the mapping relationship being a mapping relationship between each downlink carrier group and each uplink carrier group and the target manner being a manner for acquiring a target uplink carrier from the each uplink carrier group;

a third determination module, configured to determine the target uplink carrier in a present uplink carrier group according to the target manner; and a feedback module, configured to feed back a target HARQ result through the target uplink carrier, each downlink carrier group includes at least one downlink carrier, each uplink carrier group includes at least one uplink carrier, the target uplink carrier is an uplink carrier configured to carry the target HARQ result in the present uplink carrier group, and the target HARQ result includes HARQ results of downlink data carried on all the downlink carriers in a downlink carrier group corresponding to the present uplink carrier group.

Optionally, the target manner may include that:

an uplink carrier with highest channel quality in an idle channel in the each uplink carrier group is determined as the target uplink carrier; or an uplink carrier is selected from the each uplink carrier group as the target uplink carrier according to a sequence that is notified through signaling or is predefined.

Optionally, the third determination module may include:

a first execution submodule, configured to, in a case that the target manner is that the uplink carrier with the highest channel quality in the idle channel in the each uplink carrier group is determined as the target uplink carrier, perform LBT on each uplink carrier in the present uplink carrier group to obtain an LBT result; and a first determination submodule, configured to select the uplink carrier with the highest channel quality in the idle channel from the present uplink carrier group as the target uplink carrier according to the LBT result.

Optionally, the third determination module may include:

a second execution submodule, configured to, in a case that the target manner is that the uplink carrier is selected from the each uplink carrier group as the target uplink carrier according to the sequence that is notified through the signaling or is predefined, number all the uplink carriers in the present uplink carrier group according to a sequence from smallest to largest; and a second determination submodule, configured to determine a first uplink carrier of which an LBT result is success as the target uplink carrier according to numbers of all the uplink carriers.

According to a fifth aspect of the embodiments of the present disclosure, a computer-readable storage medium is provided, which may have a computer program stored thereon for executing the method for feeding back a HARQ result of the first aspect.

According to a sixth aspect of the embodiments of the present disclosure, a computer-readable storage medium is provided, which may have a computer program stored thereon for executing the method for feeding back a HARQ result of the second aspect.

According to a seventh aspect of the embodiments of the present disclosure, a device for feeding back a HARQ result is provided, which may be applied to a base station and include:

a processor; and a memory configured to store an instruction executable for the processor, wherein the processor may be configured to:

determine a mapping relationship between each downlink carrier group and each uplink carrier group, each downlink carrier group including at least one downlink carrier and each uplink carrier group including at least one uplink carrier;

determine a target manner for acquiring a target uplink carrier from the each uplink carrier group, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and send the mapping relationship and the target manner to a terminal to enable the terminal to feed back the target HARQ result through the target uplink carrier after determining the target uplink carrier in the present uplink carrier group according to the target manner.

According to an eighth aspect of the embodiments of the present disclosure, a device for feeding back a HARQ result is provided, which may be applied to a terminal and include:

a processor; and a memory configured to store an instruction executable for the processor, wherein the processor may be configured to:

receive a mapping relationship and a target manner from a base station, the mapping relationship being a mapping relationship between each downlink carrier group and each uplink carrier group and the target manner being a manner for acquiring a target uplink carrier from the each uplink carrier group;

determine the target uplink carrier in a present uplink carrier group according to the target manner; and feed back a target HARQ result through the target uplink carrier, each downlink carrier group includes at least one downlink carrier, each uplink carrier group includes at least one uplink carrier, the target uplink carrier is an uplink carrier configured to carry the target HARQ result in the present uplink carrier group, and the target HARQ result includes HARQ results of downlink data carried on all the downlink carriers in a downlink carrier group corresponding to the present uplink carrier group.

The technical solutions provided in the embodiments of the present disclosure may have the following beneficial effects.

In the embodiments of the present disclosure, a base station may send a mapping relationship between each downlink carrier group and each uplink carrier group and a target manner for acquiring the target uplink carrier from the each uplink carrier group to a terminal, and the terminal, after determining the target uplink carrier in a present uplink carrier group according to the target manner, feeds back a target HARQ result through a target uplink carrier, the target uplink carrier being an uplink carrier configured to carry the target HARQ result in the present uplink carrier group and the target HARQ result including the HARQ results of downlink data carried on all the downlink carriers in a downlink carrier group corresponding to the present uplink carrier group. Through the process, when DC is implemented between an LTE system and an LAA system, if the base station fails in CRC over a Physical Downlink Control Channel (PDCCH), only downlink data carried on all the downlink carriers in the downlink carrier group corresponding to the uplink carrier group is required to be retransmitted, so that the problem that massive downlink data has to be retransmitted because of a PUCCH CRC failure of the base station can be effectively alleviated, and reliability of a feedback on a HARQ result through a PUCCH in an LAA system can be improved.

In the embodiments of the present disclosure, when the total number of all the downlink carriers exceeds a first threshold, non-overlapping grouping may be performed on all the downlink carriers to obtain a target number of first downlink carrier groups. Meanwhile, all the uplink carriers may be divided into a target number of uplink carrier groups. The target number may be the number of the PUCCHs supported by the terminal. Each first downlink carrier group may correspond to each uplink carrier group one to one, and the base station may feed back HARQ results of downlink data in different first downlink carrier groups through the target uplink carriers in different uplink carrier groups. When DC is implemented between an LTE system and an LAA system, if the base station fails in CRC over a certain PDCCH, only downlink data carried on all the downlink carriers in the downlink carrier group corresponding to the uplink carrier group is required to be retransmitted, so that the problem that massive data has to be retransmitted because of a PUCCH CRC failure of the base station can be effectively alleviated, and reliability of a feedback of the PUCCH about a HARQ result in the LAA system can be improved.

In the embodiments of the present disclosure, when the total number of all the downlink carriers is less than a second threshold, all the downlink carriers may be divided into a same group to obtain a second downlink carrier group. All the uplink carriers may be divided into a target number of uplink carrier groups, the second downlink carrier group corresponding to each uplink carrier group. Through the process, the base station may feed back HARQ results of downlink data carried on all the downlink carriers through the target uplink carriers in different uplink carrier groups, and when the base station succeeds in CRC over a PDCCH, no downlink data is required to be retransmitted, so that reliability of a feedback on a HARQ result through a PUCCH in the LAA system can be improved.

In the embodiments of the present disclosure, when the total number of all the downlink carriers ranges from the second threshold to the first threshold, the base station may group all the downlink carriers to obtain a target number of third downlink carrier groups. The downlink carrier where target data with higher priority is located may be allocated to at least two third downlink carrier groups. Similarly, all the uplink carriers may be divided into a target number of uplink carrier groups. Each third downlink carrier group may correspond to each uplink carrier group one to one. Through the process, the base station may allocate the downlink carrier corresponding to the target data with higher priority into at least two third downlink carrier groups, and HARQ results of downlink data in different third downlink carrier groups may be fed back through the target uplink carriers in different uplink carrier groups. Reliability of feedback from the terminal about a HARQ result of the downlink data with high priority can be improved.

In the embodiments of the present disclosure, the base station may send the mapping relationship and the target manner to the terminal through target signaling, the target signaling including at least one of: the RRC signaling, the system information, the MAC CE and the physical-layer signaling, which is convenient for implementation and has high applicability.

In the embodiments of the present disclosure, the terminal, after receiving the mapping relationship and the target manner from the base station, may determine the target uplink carrier in the present uplink carrier group according to the target manner. Furthermore, the terminal may feed back the target HARQ result through the target uplink carrier. The mapping relationship may be a mapping relationship between each downlink carrier group and each uplink carrier group, and the target manner may be a manner for acquiring the target uplink carrier from the each uplink carrier group. Each downlink carrier group may include the at least one downlink carrier, each uplink carrier group may include the at least one uplink carrier, the target uplink carrier may be an uplink carrier configured to carry the target HARQ result in the present uplink carrier group, and the target HARQ result may include the HARQ results of the downlink data carried on all the downlink carriers in the downlink carrier group corresponding to the present uplink carrier group. Through the process, when DC is implemented between an LTE system and an LAA system, if the base station fails in CRC over a certain PDCCH, only the downlink data carried on all the downlink carriers in the downlink carrier group corresponding to the uplink carrier group is required to be retransmitted, so that the problem that massive data has to be retransmitted because of a PUCCH CRC failure of the base station can be effectively alleviated, and reliability of a feedback on a HARQ result through a PUCCH in the LAA system can be improved.

In the embodiments of the present disclosure, the target manner provided for the terminal by the base station may include that: an uplink carrier with the highest channel quality in the idle channel in each uplink carrier group is determined as the target uplink carrier; or an uplink carrier is selected from each uplink carrier group as the target uplink carrier according to the sequence that is notified through the signaling or is predefined. The terminal may perform LBT on each uplink carrier in the present uplink carrier group according to the target manner to obtain an LBT result, thereby selecting the uplink carrier with the highest channel quality in the idle channel as the target uplink carrier according to the LBT result. Or, all the uplink carriers in the present uplink carrier group may be numbered according to the sequence from smallest to largest, and the first uplink carrier of which the LBT result is success is determined as the target uplink carrier according to the sequencing number. Through the process, the terminal may select the target uplink carrier according to the LBT result, so that uncertainty of channel availability when a PUCCH is configured on an unauthorized carrier can be effectively alleviated, and reliability of a feedback on a HARQ result can be improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining", which depends on the context.

Figure 1A:
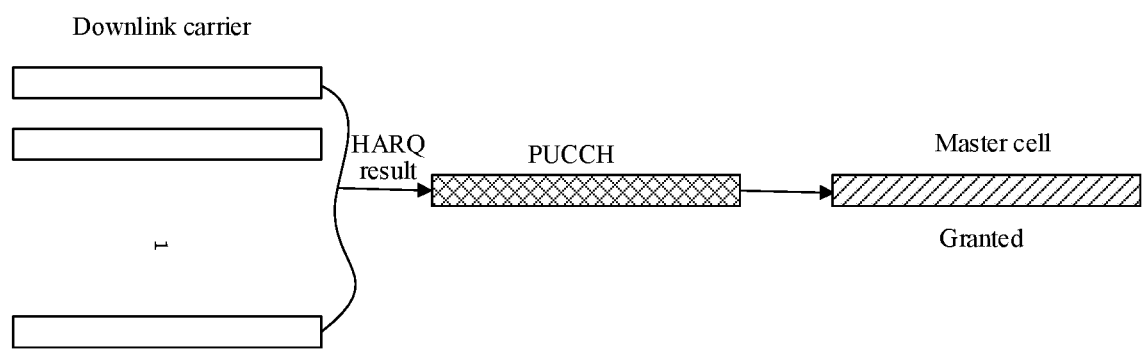
FIG. 1A is a first schematic diagrams illustrating a scenario of feeding back a HARQ result according to the related art.
Figure 1B:
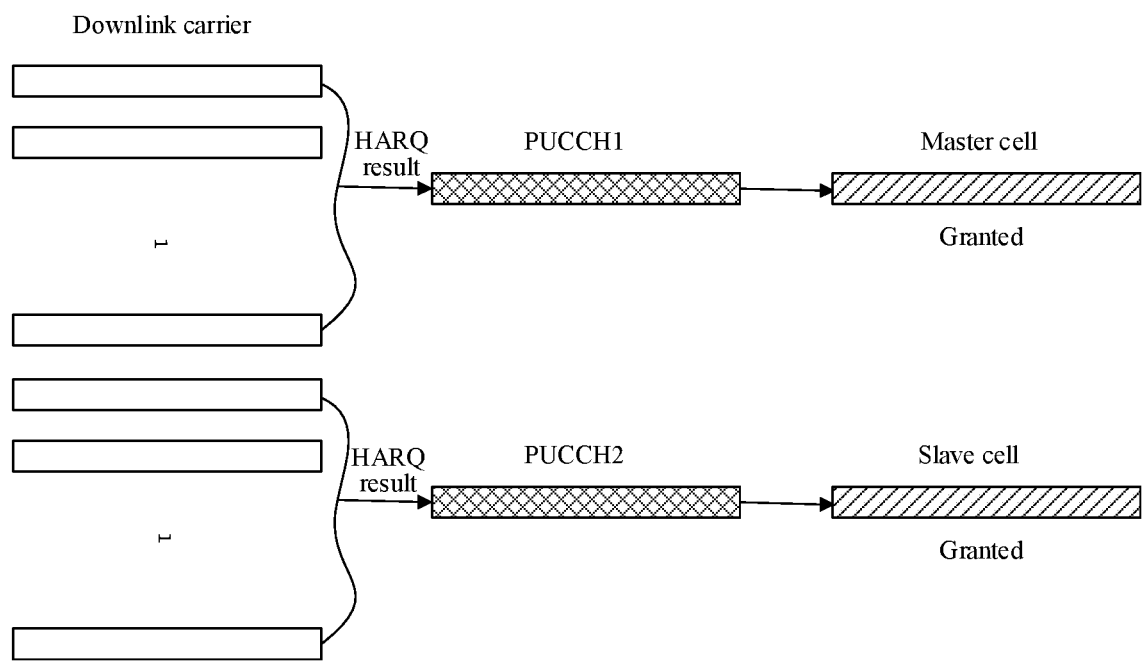
FIG. 1B is a second schematic diagram illustrating a scenario of feeding back a HARQ result according to the related art.

In a related art, uplink CA only supports a PUCCH in a master cell, and all PDSCHs are fed back on one PUCCH. In such case, a mapping manner for feeding back a HARQ result through a PUCCH is shown in FIG. 1A. A PUCCH in a slave cell is introduced into 3GPP Release 13, and at most two PUCCHs may be supported. However, the PUCCH is only configured on a granted carrier. A mapping manner for feeding back a HARQ result through a PUCCH is shown in FIG. 1B.

For solving the problem that downlink data on all downlink carriers corresponding to a PUCCH is required to be retransmitted because of a CRC failure as well as the problem of uncertain channel availability of an unauthorized spectrum caused by an LBT failure when DC is implemented between an LTE system and an LAA system, the embodiments of the present disclosure provide the following method and device for feeding back a HARQ result.

Figure 2:
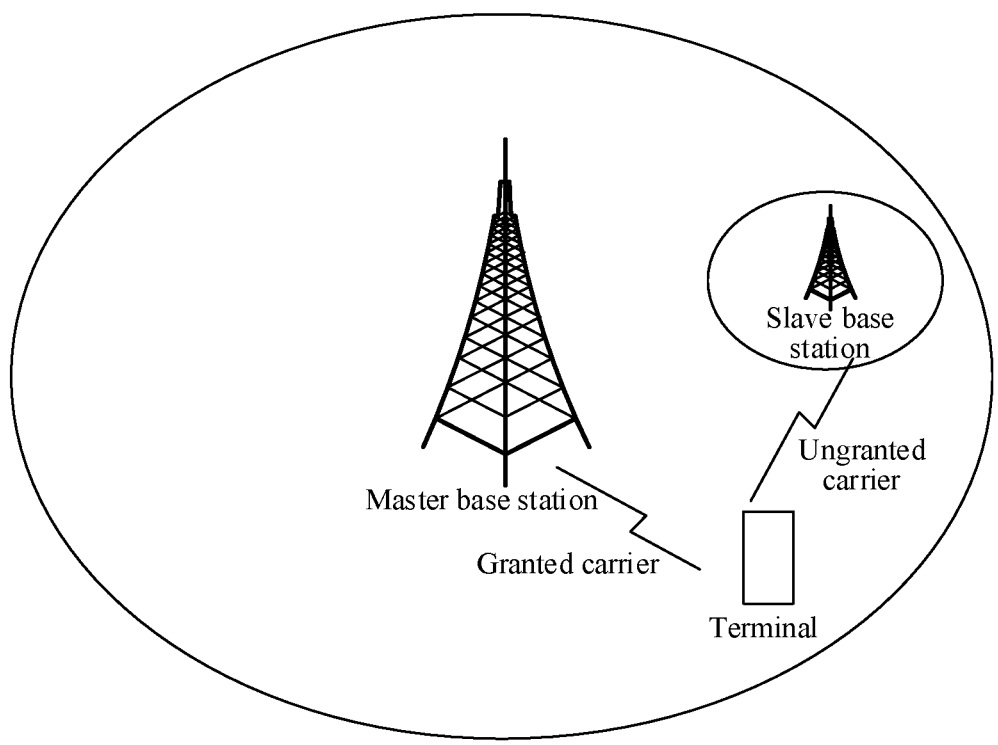
FIG. 2 is a schematic diagram illustrating a scenario of feeding back a HARQ result according to an exemplary embodiment.

A scenario of feeding back a HARQ result provided in the embodiments of the present disclosure is shown in FIG. 2. In a scenario that DC is directly implemented between LTE and LAA systems, a master base station is deployed in a granted spectrum, a slave base station is deployed in an unauthorized spectrum, and enhanced CA is implemented for the LAA system; and a terminal may support multiple PUCCHs, and each PUCCH may carry a HARQ result.

Figure 3:
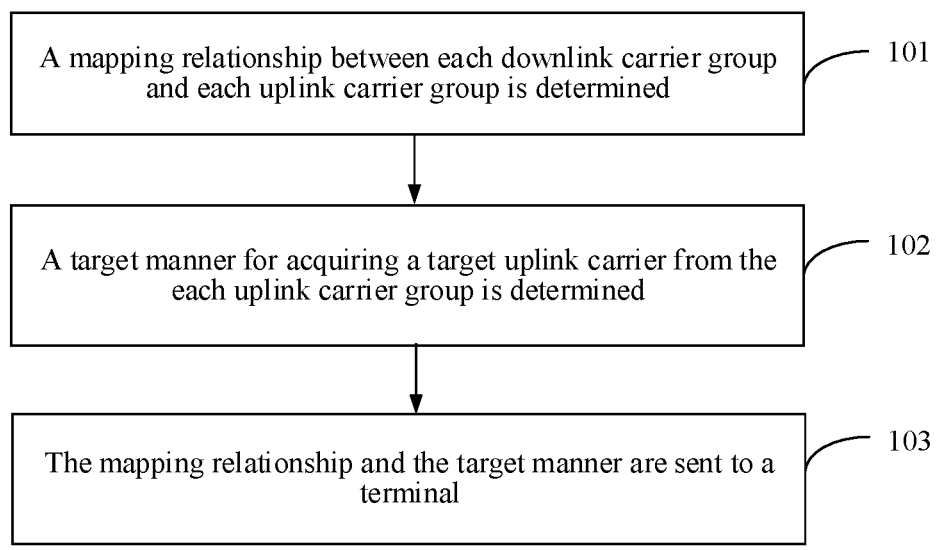
FIG. 3 is a flowchart illustrating a method for feeding back a HARQ result according to an exemplary embodiment.

An embodiment of the present disclosure provides a method for feeding back a HARQ result. Referring to FIG. 3, FIG. 3 is a flowchart illustrating a method for feeding back a HARQ result according to an exemplary embodiment. The method may be applied to a base station and includes the following steps.

In Step 101, a mapping relationship between each downlink carrier group and each uplink carrier group is determined, each downlink carrier group includes at least one downlink carrier and each uplink carrier group includes at least one uplink carrier.

In Step 102, a target manner for acquiring a target uplink carrier from the each uplink carrier group is determined, the target uplink carrier is an uplink carrier configured to carry a target HARQ result in a present uplink carrier group, and the target HARQ result includes HARQ results of downlink data carried on all the downlink carriers in a downlink carrier group corresponding to the present uplink carrier group.

In Step 103, the mapping relationship and the target manner are sent to a terminal to enable the terminal to feed back the target HARQ result through the target uplink carrier after determining the target uplink carrier in the present uplink carrier group according to the target manner.

In the embodiment, the base station may send the mapping relationship between each downlink carrier group and each uplink carrier group and the target manner for acquiring the target uplink carrier from the each uplink carrier group to the terminal, and the terminal, after determining the target uplink carrier in the present uplink carrier group according to the target manner, feeds back the target HARQ result through the target uplink carrier; the target uplink carrier is an uplink carrier configured to carry the target HARQ result in the present uplink carrier group and the target HARQ result includes the HARQ results of downlink data carried on all the downlink carriers in a downlink carrier group corresponding to the present uplink carrier group. Through the process, when DC is implemented between an LTE system and an LAA system, if the base station fails in CRC over a certain Physical Downlink Control Channel (PDCCH), only downlink data carried on all the downlink carriers in the downlink carrier group corresponding to the uplink carrier group is required to be retransmitted, so that the problem that massive downlink data has to be retransmitted because of a PUCCH CRC failure of the base station can be effectively alleviated, and reliability of a feedback on a HARQ result through a PUCCH in the LAA system can be improved.

Figure 4:
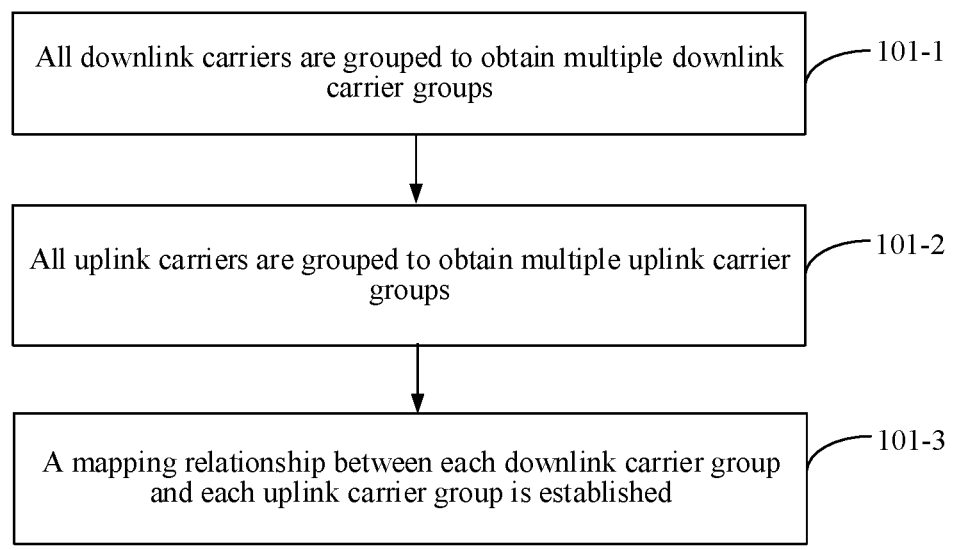
FIG. 4 is a flowchart illustrating another method for feeding back a HARQ result according to an exemplary embodiment.

For Step 101, optionally, referring to FIG. 4, FIG. 4 is a flowchart illustrating another method for feeding back a HARQ result according to the embodiment shown in FIG. 3. Step 101 may include the following steps.

In Step 101-1, all downlink carriers are grouped to obtain multiple downlink carrier groups.

In the step, the base station may group all the downlink carriers, thereby obtaining the multiple downlink carrier groups. Optionally, grouping may be performed according to the total number of the downlink carriers.

A first situation is that: the total number of all the downlink carriers exceeds a first threshold.

Under this situation, the number of downlink component carriers is relatively large, and correspondingly, more HARQ results are needed to be fed back, which may result in that a PUCCH is overloaded. Therefore, when the downlink carriers are grouped, non-overlapping grouping may be performed on the downlink carriers. All the downlink carriers may be divided into a target number of first downlink carrier groups, any two first downlink carrier groups may include different downlink carriers and the target number may be the number of PUCCHs supported by the terminal.

Figure 5A:
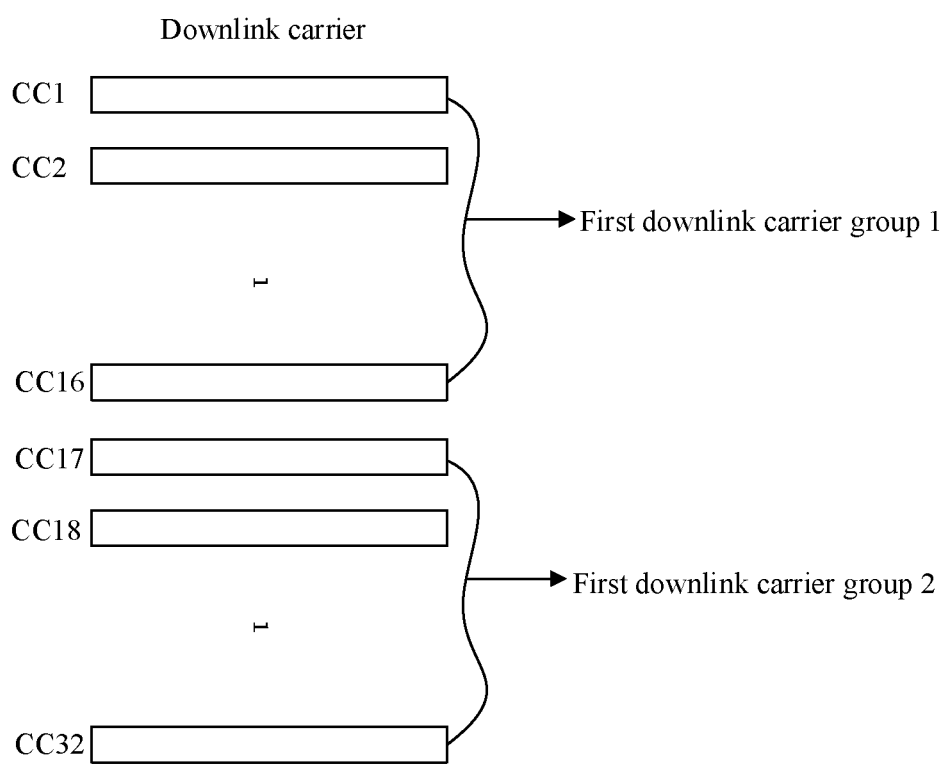
FIG. 5A is a first schematic diagram illustrating a scenario of feeding back a HARQ result according to an exemplary embodiment.

For example, when enhanced CA is deployed in an unauthorized spectrum in a DC scenario, 32 downlink carriers are aggregated, and the terminal supports two PUCCHs. In such case, the total number of the downlink carriers is relatively large and exceeds the first threshold, and all the downlink carriers may be divided into first downlink carrier group 1 and first downlink carrier group 2 that are non-overlapping. As shown in FIG. 5A, downlink carrier CC1 to downlink carrier CC16 are divided into a group, and downlink carrier CC17 to downlink carrier CC32 are divided into another group.

A second situation is that: the total number of all the downlink carriers is less than a second threshold.

In the embodiment of the present disclosure, the second threshold is less than the first threshold. Under this situation, the number of the downlink component carriers is relatively small, HARQ results corresponding to all the downlink carriers may completely be carried through a PUCCH, and then complete overlapping grouping may be performed. All the downlink carriers may be divided into a group to obtain a second downlink carrier group, and the HARQ results corresponding to all the downlink carriers may be subsequently fed back through different target uplink carriers, so that reliability of a feedback on a HARQ result can be improved.

Figure 5B:
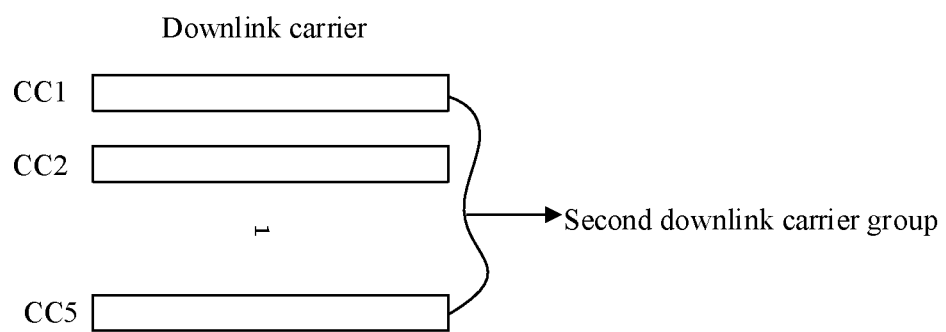
FIG. 5B is a second schematic diagram illustrating a scenario of feeding back a HARQ result according to an exemplary embodiment.

For example, when enhanced CA is deployed in the unauthorized spectrum in the DC scenario, 5 downlink carriers are aggregated, and the terminal supports two PUCCHs. In such case, the total number of the downlink carriers is relatively small and less than the second threshold, and all the downlink carriers may be divided into a group to obtain the second downlink carrier group. As shown in FIG. 5B, downlink carrier CC1 to downlink carrier CC5 are divided into the same group.

A third situation is that: the total number of all the downlink carriers ranges from the second threshold to the first threshold.

Under this situation, the total number of the downlink carriers ranges from the second threshold to the first threshold; if the HARQ results corresponding to all the downlink carriers are fed back through one PUCCH, the PUCCH may be overloaded, and if the downlink carriers are divided into multiple downlink carrier groups that are completely non-overlapping, waste may be brought. Therefore, partial overlapping grouping may be performed on all the downlink carriers to divide the downlink carrier carrying data with higher priority into different downlink carrier groups in an overlapping manner to obtain multiple third downlink carrier groups. The number of the third downlink carrier groups may also be the number of the PUCCHs supported by the terminal. The reliability of a feedback on a HARQ result can be improved.

Figure 5C:
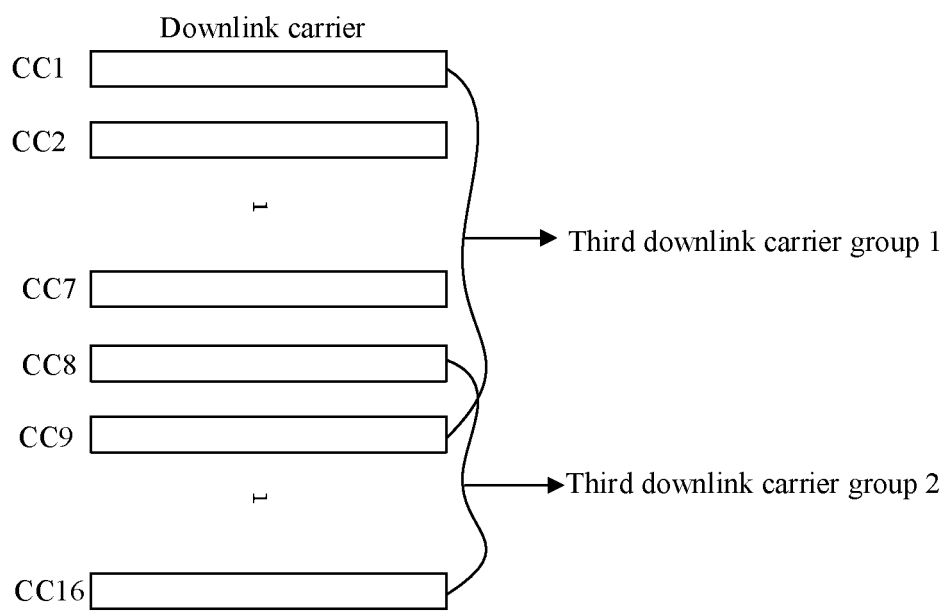
FIG. 5C is a third schematic diagram illustrating a scenario of feeding back a HARQ result according to an exemplary embodiment.

For example, when enhanced CA is deployed in the unauthorized spectrum in the DC scenario, 16 downlink carriers are aggregated, and the terminal supports two PUCCHs, downlink data carried on downlink carrier CC8 and downlink carrier CC9 have relatively high priority. As shown in FIG. 5C, downlink component CC1 to downlink carrier CC9 may be divided into a group, and the downlink carrier CC8 to downlink carrier CC16 may be divided into another group. The downlink carrier CC8 and downlink carrier CC9 which have higher priority belong to both third downlink carrier group 1 and third downlink carrier group 2.

In Step 101-2, all uplink carriers are grouped to obtain multiple uplink carrier groups.

In the step, the base station may further perform non-overlapping grouping on all the uplink carriers, and all the uplink carriers are divided into the target number of groups, the target number being the number of the PUCCHs supported by the terminal.

Figure 6:
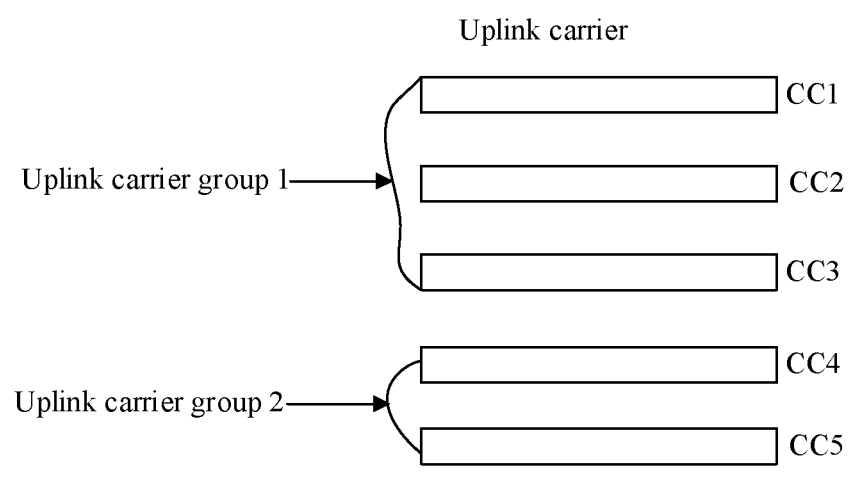
FIG. 6 is a schematic diagram illustrating another scenario of feeding back a HARQ result according to an exemplary embodiment.

For example, when enhanced CA is deployed in the unauthorized spectrum in the DC scenario, 5 uplink carriers are aggregated, as shown in FIG. 6, and the terminal supports two PUCCHs, Then, uplink carrier CC1 to uplink carrier CC3 may be divided into uplink carrier group 1, and uplink carrier CC4 and uplink carrier CC5 may be divided into uplink carrier group 2.

In Step 101-3, the mapping relationship between each downlink carrier group and each uplink carrier group is established.

In the step, the base station has divided all the downlink carriers and all the uplink carriers, and if the group number of the downlink carrier groups is the target number, a mapping relationship that each downlink carrier group corresponds to each uplink carrier group one to one may be established because the number of the uplink carrier groups is also the target number.

For example, if the target number is 2, the base station divides the downlink carrier CC1 to the downlink carrier CC16 into the first downlink carrier group 1 and divides the downlink carrier CC17 to the downlink carrier CC32 into the first downlink carrier group 2, and in addition, the base station divides the uplink carrier CC1 to the uplink carrier CC3 into the uplink carrier group 1 and divides the uplink carrier CC4 and uplink carrier CC5 into the uplink carrier group 2. Then, the established mapping relationship is shown in Table 1.

TABLE 1

| Downlink carrier group | Uplink carrier group |
| --- | --- |
| First downlink carrier group 1 (downlink carrier CC1 to downlink carrier CC16) | Uplink carrier group 1 (uplink carrier CC1 to uplink carrier CC3) |
| First downlink carrier group 2 (downlink carrier CC16 to downlink carrier CC32) | Uplink carrier group 2 (uplink carrier CC4 and uplink carrier CC5) |

In the embodiment of the present disclosure, if the group number of the downlink carrier groups is 1, a mapping relationship between the downlink carrier group and each uplink carrier group may be established.

For example, the base station divides the downlink carrier CC1 to the downlink carrier CC5 into the same group to obtain the second downlink carrier group, and in addition, the base station divides the uplink carrier CC1 to the uplink carrier CC3 into the uplink carrier group 1 and divides the uplink carrier CC4 and the uplink carrier CC5 into the uplink carrier group 2. Then, the established mapping relationship may be shown in Table 2.

TABLE 2

| Downlink carrier group | Uplink carrier group |
| --- | --- |
| Second downlink carrier group (downlink carrier CC1 to downlink carrier CC5) | Uplink carrier group 1 (uplink carrier CC1 to uplink carrier CC3) |
| Second downlink carrier group (downlink carrier CC1 to downlink carrier CC5) | Uplink carrier group 2 (uplink carrier CC4 and uplink carrier CC5) |

For Step 102, the base station, besides determining the mapping relationship between each downlink carrier group and each uplink carrier group for the terminal, may further determine for the terminal the target manner for acquiring the target uplink carrier from the each uplink carrier group.

The target uplink carrier may be an uplink carrier configured to carry the target HARQ result in the present uplink carrier group, and the target HARQ result may include the HARQ results of downlink data carried on all the downlink carriers in the downlink carrier group corresponding to the present uplink carrier group.

For example, the present uplink carrier group includes the uplink carrier CC1, the uplink carrier CC2 and the uplink carrier CC3, and the downlink carrier group corresponding to the present uplink carrier group is the first downlink carrier group 1 and includes the downlink carrier CC1 to the downlink carrier CC16. The target uplink carrier is one of the uplink carrier CC1, the uplink carrier CC2 and the uplink carrier CC3, and is configured to carry HARQ results of the downlink data carried on the downlink carrier CC1 to the downlink carrier CC16.

In the embodiment of the present disclosure, the target manner for acquiring the target uplink carrier may include any one of that:

an uplink carrier with highest channel quality in an idle channel in each uplink carrier group is determined as the target uplink carrier; or an uplink carrier is selected from each uplink carrier group as the target uplink carrier according to a sequence that is notified through signaling or is predefined.

The base station may specify any manner as the target manner for acquiring, by the terminal, the target uplink carrier in the uplink carrier group.

For Step 103, the base station, after determining the mapping relationship and the target manner, may send the mapping relationship and the target manner to the terminal through target signaling.

The target signaling may be RRC signaling, a system message, a MAC CE or physical-layer signaling, etc.

In the embodiment of the present disclosure, the mapping relationship and the target manner may be pre-specified in a communication protocol, and the terminal may group all the downlink carriers and all the uplink carriers according to the specification in the communication protocol and according to the abovementioned manner and further establish the mapping relationship. In addition, the terminal may also directly determine the target manner for acquiring the target uplink carrier in the present uplink carrier group according to the content specified in the communication protocol.

Figure 7:
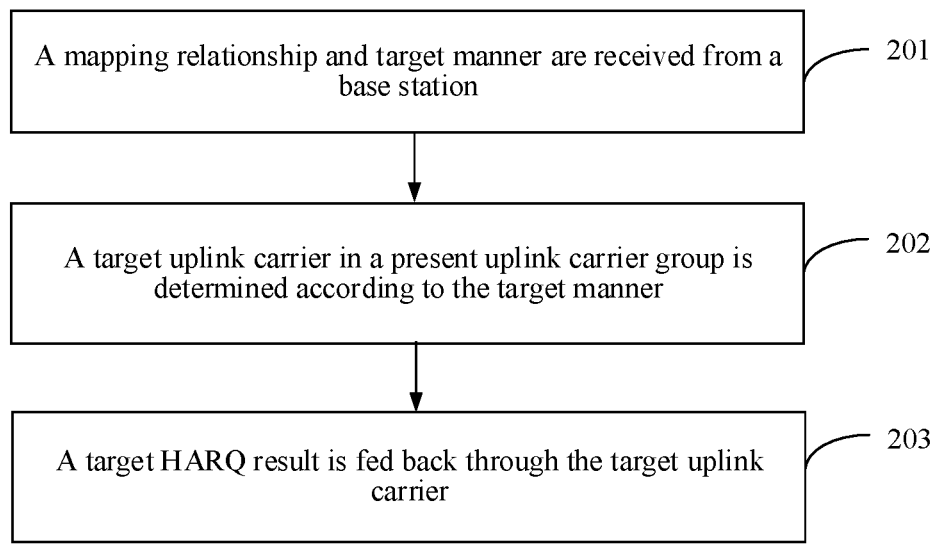
FIG. 7 is a flowchart illustrating another method for feeding back a HARQ result according to an exemplary embodiment.

An embodiment of the present disclosure also provides another method for feeding back a HARQ result. Referring to FIG. 7, FIG. 7 is a flowchart illustrating another method for feeding back a HARQ result according to an exemplary embodiment. The method may be applied to a terminal and includes the following steps.

In Step 201, a mapping relationship and a target manner are received from a base station, the mapping relationship being a mapping relationship between each downlink carrier group and each uplink carrier group and the target manner being a manner for acquiring a target uplink carrier from the each uplink carrier group.

In Step 202, the target uplink carrier in a present uplink carrier group is determined according to the target manner.

In Step 203, a target HARQ result is fed back through the target uplink carrier.

Each downlink carrier group includes at least one downlink carrier, each uplink carrier group includes at least one uplink carrier, the target uplink carrier is an uplink carrier configured to carry the target HARQ result in the present uplink carrier group, and the target HARQ result includes HARQ results of downlink data carried on all the downlink carriers in a downlink carrier group corresponding to the present uplink carrier group.

In the embodiment, the terminal, after receiving the mapping relationship and the target manner from the base station, may determine the target uplink carrier in the present uplink carrier group according to the target manner. Furthermore, the terminal may feed back the target HARQ result through the target uplink carrier. The mapping relationship may be a mapping relationship between each downlink carrier group and each uplink carrier group, and the target manner may be a manner for acquiring the target uplink carrier from the each uplink carrier group. Each downlink carrier group may include the at least one downlink carrier, each uplink carrier group may include the at least one uplink carrier, the target uplink carrier may be the uplink carrier configured to carry the target HARQ result in the present uplink carrier group, and the target HARQ result may include the HARQ results of the downlink data carried on all the downlink carriers in the downlink carrier group corresponding to the present uplink carrier group. Through the process, when DC is implemented between an LTE system and an LAA system, if the base station fails in CRC over a certain PDCCH, only downlink data carried on all the downlink carriers in the downlink carrier group corresponding to the uplink carrier group is required to be retransmitted, so that the problem that massive data has to be retransmitted because of a PUCCH CRC failure of the base station can be effectively alleviated, and reliability of a feedback on a HARQ result through a PUCCH in the LAA system can be improved.

For Step 201, the base station, after determining the mapping relationship and the target manner, may send the mapping relationship and the target manner to the terminal through target signaling, and the terminal directly receives them.

The mapping relationship may be a mapping relationship between each downlink carrier group and each uplink carrier group, and the target manner may be a manner for acquiring the target uplink carrier from the each uplink carrier group. The target uplink carrier may be an uplink carrier configured to carry the target HARQ result in the present uplink carrier group, and the target HARQ result may include the HARQ results of downlink data carried on all the downlink carriers in a downlink carrier group corresponding to the present uplink carrier group.

For Step 202, the terminal may determine the target uplink carrier in the present uplink carrier group according to the target manner specified by the base station.

In the step, in a case that the target manner is that the uplink carrier with highest channel quality in an idle channel in each uplink carrier group is determined as the target uplink carrier, the terminal may perform LBT on each uplink carrier in the present uplink carrier group according to the related art, thereby obtaining an LBT result corresponding to each uplink carrier.

Furthermore, the terminal may determine the uplink carrier with the highest channel quality in the idle channel in the present uplink carrier group as the target uplink carrier according to the LBT result corresponding to each uplink carrier. In a case that a channel may be occupied or released (idle) by a signal source only, when the signal source occupying the channel releases the channel, the channel may change to an idle state, namely the channel is an idle channel. In the embodiment of the present disclosure, the target uplink carrier may be an uplink carrier with the highest channel quality in the idle channel. For example, when the present uplink carrier group includes uplink carrier CC1 to uplink carrier CC3 and it may be determined according to LBT results that the uplink carrier CC3 is the uplink carrier with the highest channel quality in the idle channel, the terminal may determine the uplink carrier CC3 as the target uplink carrier.

Determining the target uplink carrier in such a target manner may improve accuracy of transmission. In addition, the target uplink carrier may also be determined in another target manner, and the target manner may be that an uplink carrier is selected from each uplink carrier group as the target uplink carrier according to a sequence that is notified through signaling or is predefined. Then, the terminal may number all uplink carriers in the present uplink carrier group according to a sequence from smallest to largest and then determine the first uplink carrier of which the LBT result is success as the target uplink carrier according to numbers of all the uplink carriers.

The sequence notified through the signaling may be a sequence notified by the base station through target signaling to the terminal to select the uplink carrier as the target uplink carrier. Optionally, the target signaling may be RRC signaling, system information, a MAC CE and physical-layer signaling. For example, the base station may send the sequence from smallest to largest to the terminal through any signaling in the target signaling.

The predefined sequence may be a sequence that has been defined for selecting the target uplink carrier in a communication protocol. For example, it has been specified in the communication protocol that the terminal may sequentially select the uplink carrier as the target uplink carrier according to the sequence from smallest to largest.

For example, when the present uplink carrier group includes four uplink carriers numbered to be CC1, CC2, CC3 and CC4 respectively, the terminal may perform LBT on the uplink carrier CC1 and, if an LBT result is success, the terminal may determine the uplink carrier CC1 as the target uplink carrier; if the LBT result of the uplink carrier CC1 is failure, the terminal may continue performing LBT on the uplink carrier CC2 and, if an LBT result corresponding to the uplink carrier CC2 is success, the terminal may determine the uplink carrier CC2 as the target uplink carrier; and if the LBT result corresponding to the uplink carrier CC2 is failure, LBT may be continued to be performed on the uplink carrier CC3, etc. until the target uplink carrier is found.

Determining the target uplink carrier in the second target manner may greatly reduce complexity of blind detection of the base station over a PUCCH.

Through the process, the terminal may select the target uplink carrier according to the LBT result, so that uncertain channel availability when the PUCCH is configured in an unauthorized carrier can be effectively alleviated, and reliability of a feedback on a HARQ result can be improved.

The terminal can obtain the target uplink carrier in the present uplink carrier group in either manner. Assuming that the mapping relationship between each downlink carrier group and each uplink carrier group is as shown in Table 1 and the terminal obtains in any manner a target uplink carrier which is the uplink carrier CC3 from uplink carrier group 1 and obtains a target uplink carrier which is the uplink carrier CC5 from uplink carrier group 2, then, a mapping relationship among a downlink carrier group, an uplink carrier group and a target uplink carrier may be as shown in Table 3.

TABLE 3

| Downlink carrier group | Uplink carrier group | Target uplink carrier |
| --- | --- | --- |
| First downlink carrier group 1 (downlink carrier CC1 to downlink carrier CC16) | Uplink carrier group 1 (uplink carrier CC1 to uplink carrier CC3) | Uplink carrier CC3 |
| First downlink carrier group 2 (downlink carrier CC16 to downlink carrier CC32) | Uplink carrier group 1 (uplink carrier CC4 and uplink carrier CC5) | Uplink carrier CC5 |

For Step 203, the terminal may feed back the target HARQ result through the target uplink carrier determined in the abovementioned step according to the related art. That is, the HARQ results of the downlink data carried on all the downlink carriers in the downlink carrier group corresponding to the present uplink carrier group are fed back through the target uplink carrier.

For example, the mapping relationship among the downlink carrier group, the uplink carrier group and the target uplink carrier is shown in Table 3. The terminal may feed back HARQ results of downlink data carried on downlink carrier CC1 to downlink carrier CC16 through the uplink carrier CC3 and feed back HARQ results of downlink data carried on the downlink carrier CC16 to downlink carrier CC32 through uplink carrier CC5.

The HARQ result may include an Acknowledgement (ACK) or a Negative Acknowledgement (NACK). The base station, upon when receiving the ACK, may determine that the corresponding downlink data has been successfully received by the terminal, and the base station, upon when receiving the NACK, may determine that the corresponding downlink data is not successfully received by the terminal and is required to be retransmitted.

In the embodiment, when DC is implemented between an LTE system and an LAA system, the problem that massive data has to be retransmitted because of a PUCCH CRC failure of the base station can be effectively alleviated, and reliability of a feedback on a HARQ result through a PUCCH in the LAA system can be improved.

Figure 8:
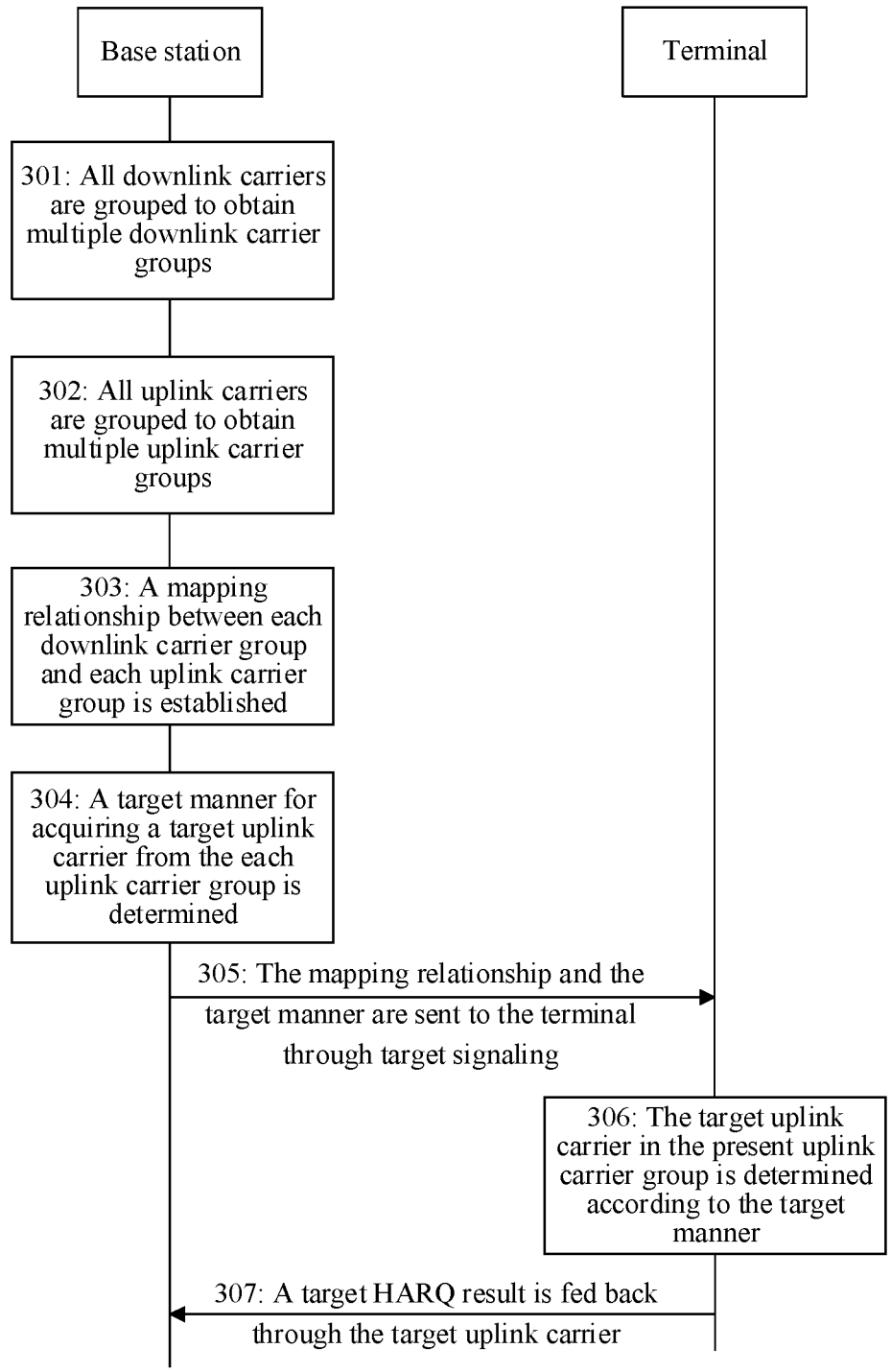
FIG. 8 is a flowchart illustrating another method for feeding back a HARQ result according to an exemplary embodiment.

An embodiment of the present disclosure also provides another method for feeding back a HARQ result. Referring to FIG. 8, FIG. 8 is a flowchart illustrating another method for feeding back a HARQ result according to an exemplary embodiment. The method includes the following steps.

In Step 301, a base station groups all downlink carriers to obtain multiple downlink carrier groups.

In Step 302, the base station groups all uplink carriers to obtain multiple uplink carrier groups.

In Step 303, the base station establishes a mapping relationship between each downlink carrier group and each uplink carrier group.

In Step 304, the base station determines a target manner for acquiring a target uplink carrier from the each uplink carrier group.

The target uplink carrier may be an uplink carrier configured to carry a target HARQ result in a present uplink carrier group, and the target HARQ result may include HARQ results of downlink data carried on all the downlink carriers in a downlink carrier group corresponding to the present uplink carrier group.

The target manner may include that: an uplink carrier with highest channel quality in an idle channel in each uplink carrier group is determined as the target uplink carrier; or an uplink carrier is selected from each uplink carrier group as the target uplink carrier according to a sequence that is notified through signaling or is predefined.

In Step 305, the base station sends the mapping relationship and the target manner to a terminal through target signaling.

The target signaling may be RRC signaling, system information, a MAC CE or physical-layer signaling, which is convenient for implementation and has high applicability.

In Step 306, the terminal determines the target uplink carrier in the present uplink carrier group according to the target manner.

In Step 307, the terminal feeds back the target HARQ result through the target uplink carrier.

In the embodiment, when DC is implemented between an LTE system and an LAA system, if the base station fails in CRC over a PDCCH, only downlink data carried on all the downlink carriers in the downlink carrier group corresponding to the uplink carrier group is required to be retransmitted, so that the problem that massive downlink data has to be retransmitted because of a PUCCH CRC failure of the base station can be effectively alleviated, and reliability of a feedback on a HARQ result through a PUCCH in the LAA system can be improved.

The process will further be described below with an example.

Figure 9A:
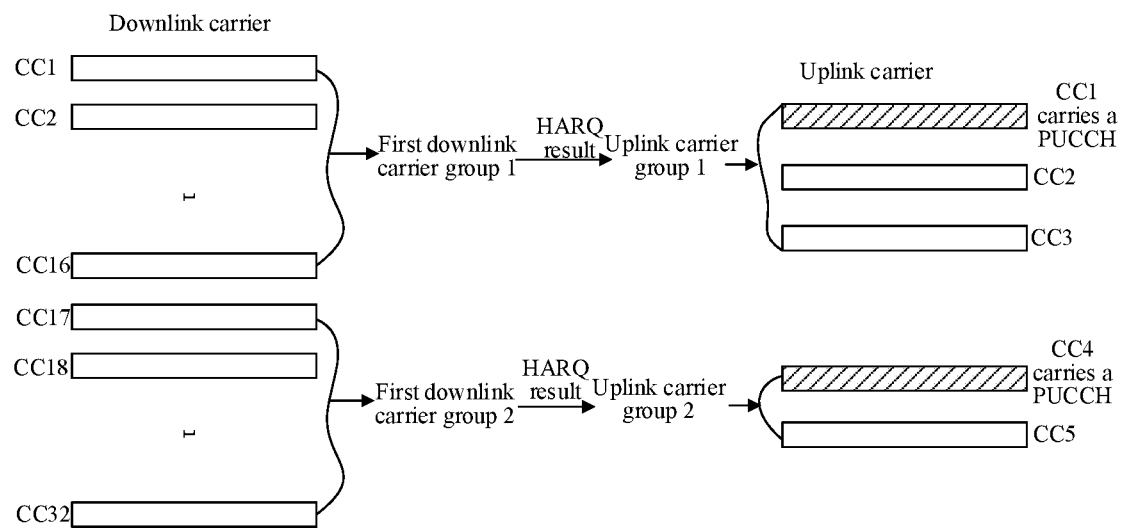
FIG. 9A is a first schematic diagram illustrating a scenario of feeding back a HARQ result according to an exemplary embodiment.

As shown in FIG. 9A, when enhanced CA is deployed in an unauthorized spectrum in a DC scenario, 32 downlink carriers are aggregated, 5 uplink carriers are aggregated, and the terminal supports two PUCCHs. Considering that the number of the downlink carriers is relatively large, non-overlapping grouping may be adopted for the downlink carriers. The downlink carrier CC1 to the downlink carrier CC16 may be divided into first downlink carrier group 1 and mapped to uplink carrier group 1 for transmission, and the downlink carrier CC16 to the downlink carrier CC32 may be divided into first downlink carrier group 2 and mapped to an uplink carrier group 2 for transmission. The uplink carrier CC1 to the uplink carrier CC3 may be divided into the uplink carrier group 1, and the uplink carrier CC4 and the uplink carrier CC5 may be divided into the uplink carrier group 2. The target manner may be that the uplink carrier with the highest channel quality in the idle channel in each uplink carrier group is determined as the target uplink carrier.

The terminal may select the uplink carrier CC1 and uplink carrier CC4 which have the highest channel quality in the idle channel according to the LBT result to transmit PUCCH1 and PUCCH2 respectively, the PUCCH1 and the PUCCH2 correspondingly transmitting the HARQ results of the downlink data carried on all the downlink carriers in the first downlink carrier group 1 and the first downlink carrier group 2 respectively.

In the embodiment, the base station may feed back the HARQ results of the downlink data in different first downlink carrier groups through the target uplink carriers in different uplink carrier groups. When DC is implemented between the LTE system and the LAA system, if the base station fails in CRC over a PDCCH, only downlink data carried on all the downlink carriers in the downlink carrier group corresponding to the uplink carrier group is required to be retransmitted, so that the problem that massive data has to be retransmitted because of a PUCCH CRC failure of the base station can be effectively alleviated, and reliability of a feedback on a HARQ result through a PUCCH in the LAA system can be improved.

Figure 9B:
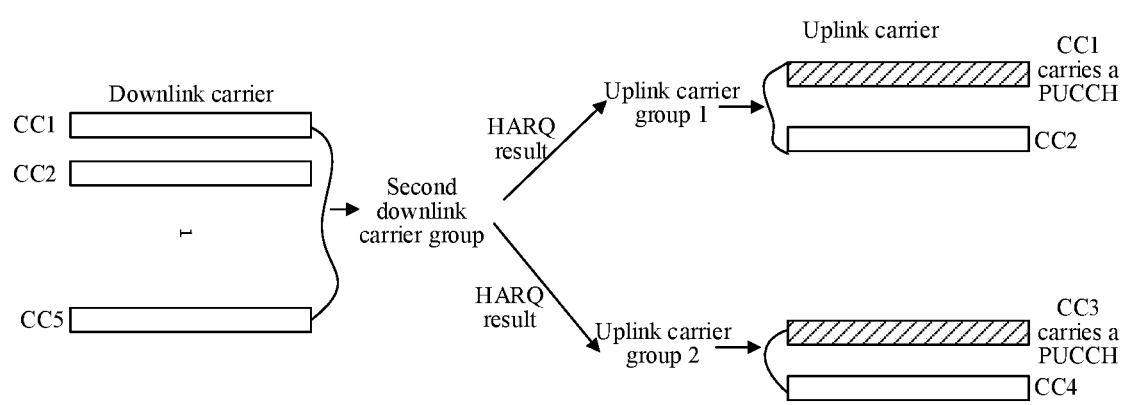
FIG. 9B is a second schematic diagram illustrating a scenario of feeding back a HARQ result according to an exemplary embodiment.

As shown in FIG. 9B, when enhanced CA is deployed in the unauthorized spectrum in the DC scenario, 5 downlink carriers are aggregated, 4 uplink carriers are aggregated, and the terminal supports two PUCCHs. Considering that the number of the downlink carriers is relatively small, complete overlapping grouping may be adopted for the downlink carriers. The downlink carrier CC1 to the downlink carrier CC5 may be divided into the same group, i.e., a second downlink carrier group, for transmission. The uplink carrier CC1 and the uplink carrier CC2 may be divided into the uplink carrier group 1, and the uplink carrier CC3 and the uplink carrier CC4 may be divided into the uplink carrier group 2. The target manner may be that the uplink carrier with the highest channel quality in the idle channel in each uplink carrier group is determined as the target uplink carrier.

The terminal may select the uplink carrier CC1 and uplink carrier CC3 which have the highest channel quality in the idle channel according to the LBT result to transmit a PUCCH1 and a PUCCH2 respectively, both the PUCCH1 and the PUCCH2 correspondingly transmitting the HARQ results of the downlink data carried on all the downlink carriers in the second downlink carrier group.

In the embodiment, the base station may feed back HARQ results of downlink data in all the downlink carriers through the target uplink carriers in different uplink carrier groups, and when the base station succeeds in CRC over a PDCCH, no downlink data is required to be retransmitted, so that reliability of a feedback on a HARQ result through a PUCCH in the LAA system can be improved.

Figure 9C:
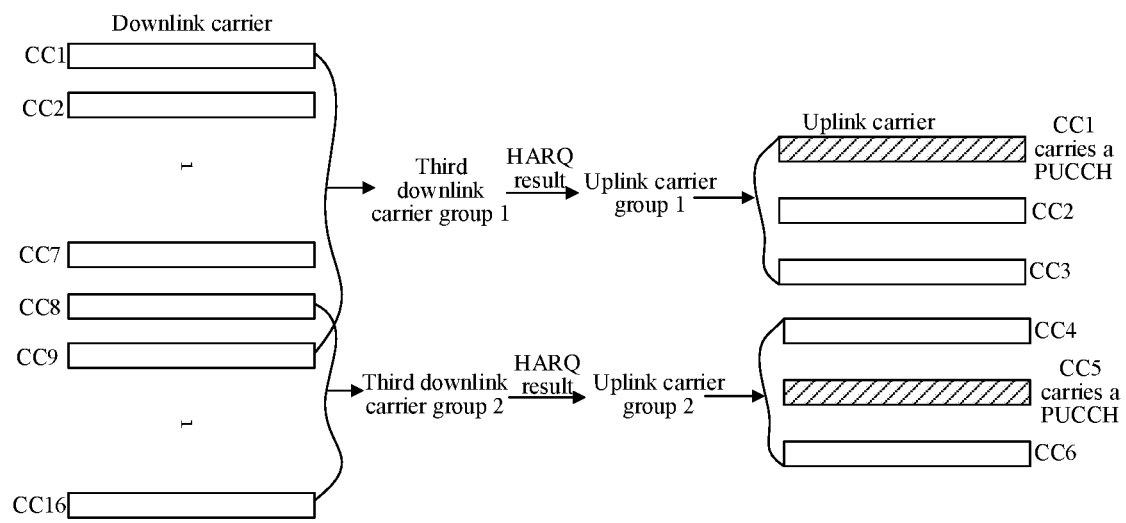
FIG. 9C is a third schematic diagram illustrating a scenario of feeding back a HARQ result according to an exemplary embodiment.

As shown in FIG. 9C, when enhanced CA is deployed in the unauthorized spectrum in the DC scenario, 16 downlink carriers are aggregated, 6 uplink carriers are aggregated, and the terminal supports two PUCCHs. Considering that the number of the downlink carriers ranges from a second threshold to a first threshold, partial overlapping grouping may be adopted for the downlink carriers. The downlink data carried on the downlink carrier CC8 and the downlink carrier CC9 has higher priority.

In such case, the downlink carrier CC1 to the downlink carrier CC9 may be divided into a group to obtain third downlink carrier group 1, and the downlink carrier CC17 to the downlink carrier CC32 may be divided into a group to obtain third downlink carrier group 2. The uplink carrier CC1 to the uplink carrier CC3 may be divided into the uplink carrier group 1, and the uplink carrier CC4 to the uplink carrier CC6 may be divided into the uplink carrier group 2. The target manner may be that the uplink carrier with the highest channel quality in the idle channel in each uplink carrier group may be determined as the target uplink carrier.

The terminal may select the uplink carrier CC1 and uplink carrier CC5 which have the highest channel quality in the idle channel according to the LBT result to transmit PUCCH1 and PUCCH2 respectively, both the PUCCH1 and the PUCCH2 correspondingly transmitting the HARQ results of the downlink data carried on all the downlink carriers in the third downlink carrier group 1 and the third downlink carrier group 2.

In the embodiment, the base station may allocate the downlink carrier corresponding to the target data with higher priority into at least two third downlink carrier groups, and HARQ results of downlink data in different third downlink carrier groups may be fed back through the target uplink carriers in different uplink carrier groups. Reliability of feedback from the terminal on a HARQ result of the downlink data with high priority can be improved.

For simple description, each of the abovementioned method embodiments is expressed as a combination of a series of operations, but those skilled in the art should know that the present disclosure is not limited to the described operation sequence because some steps may be executed in other sequences or at the same time according to the present disclosure.

Second, those skilled in the art should also know that all the embodiments described in the specification are optional embodiments and involved operations and modules are not always required by the present disclosure.

Corresponding to the abovementioned application function realization method embodiments, the present disclosure also provides an application function realization device and a corresponding embodiment.

Figure 10:
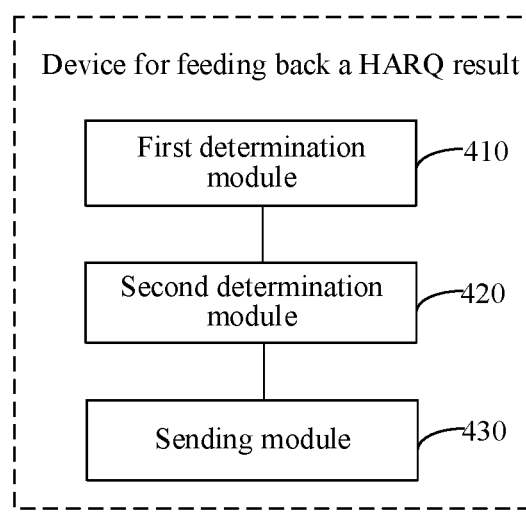
FIG. 10 is a block diagram of a device for feeding back a HARQ result according to an exemplary embodiment.

FIG. 10 is a block diagram of a device for feeding back a HARQ result according to an exemplary embodiment. The device is applied to a base station. The device includes:

a first determination module 410, configured to determine a mapping relationship between each downlink carrier group and each uplink carrier group, each downlink carrier group including at least one downlink carrier and each uplink carrier group including at least one uplink carrier;

a second determination module 420, configured to determine a target manner for acquiring a target uplink carrier from the each uplink carrier group, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and a sending module 430, configured to send the mapping relationship and the target manner to a terminal to enable the terminal to feed back the target HARQ result through the target uplink carrier after determining the target uplink carrier in the present uplink carrier group according to the target manner.

In the embodiment, the base station may send the mapping relationship between each downlink carrier group and each uplink carrier group and the target manner for acquiring the target uplink carrier from the each uplink carrier group to the terminal, and the terminal, after determining the target uplink carrier in the present uplink carrier group according to the target manner, may feed back the target HARQ result through the target uplink carrier, the target uplink carrier may be an uplink carrier configured to carry the target HARQ result in the present uplink carrier group and the target HARQ result may include the HARQ results of downlink data carried on all the downlink carriers in the downlink carrier group corresponding to the present uplink carrier group. Through the process, when DC is implemented between an LTE system and an LAA system, if the base station fails in CRC over a certain PDCCH, only downlink data carried on all the downlink carriers in the downlink carrier group corresponding to the uplink carrier group is required to be retransmitted, so that the problem that massive downlink data has to be retransmitted because of a PUCCH CRC failure of the base station can be effectively alleviated, and reliability of a feedback on a HARQ result through a PUCCH in the LAA system can be improved.

Figure 11:
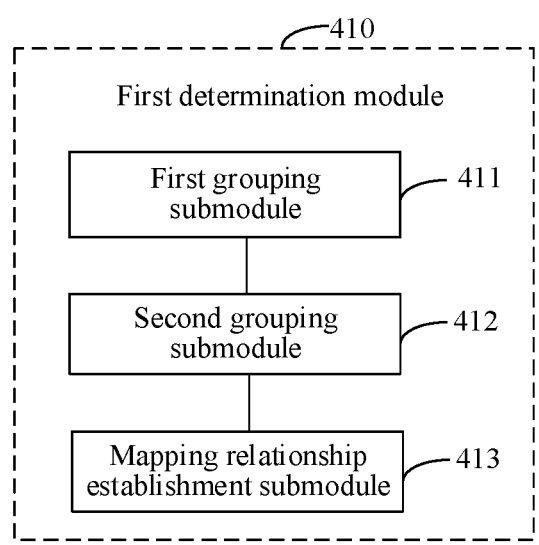
FIG. 11 is a block diagram of another device for feeding back a HARQ result according to an exemplary embodiment.

Referring to FIG. 11, FIG. 11 is a block diagram of another device for feeding back a HARQ result based on the embodiment shown in FIG. 10. The first determination module 410 includes:

a first grouping submodule 411, configured to group all downlink carriers to obtain multiple downlink carrier groups;

a second grouping submodule 412, configured to group all uplink carriers to obtain multiple uplink carrier groups; and a mapping relationship establishment submodule 413, configured to establish the mapping relationship between each downlink carrier group and each uplink carrier group.

In the embodiment, the base station may group the downlink carriers and the uplink carriers respectively, thereby establishing the mapping relationship between each downlink carrier group and each uplink carrier group to ensure that the target HARQ result may subsequently be fed back through the target uplink carriers in different uplink carrier groups. The target HARQ result may include the HARQ results of the downlink data carried on all the downlink carriers in the downlink carrier group corresponding to the present uplink carrier group. When DC is implemented between the LTE system and the LAA system, reliability of a feedback on a HARQ result through a PUCCH in the LAA system can be improved.

Figure 12:
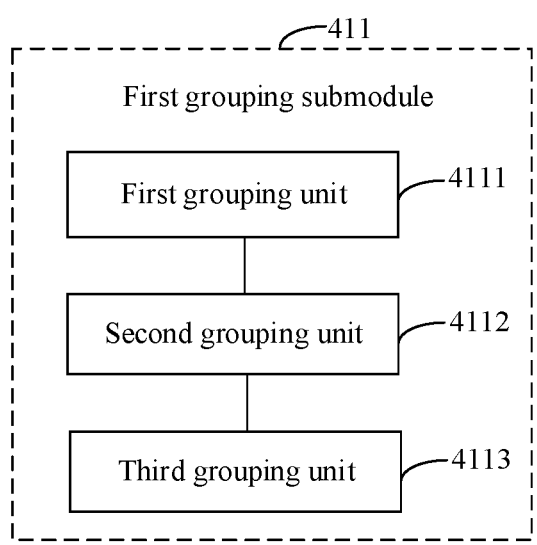
FIG. 12 is a block diagram of another device for feeding back a HARQ result according to an exemplary embodiment.

Referring to FIG. 12, FIG. 12 is a block diagram of another device for feeding back a HARQ result based on the embodiment shown in FIG. 11. The first grouping submodule 411 may include:

a first grouping unit 4111, configured to, when the total number of all the downlink carriers exceeds a first threshold, divide all the downlink carriers into a target number of first downlink carrier groups, any two first downlink carrier groups including different downlink carriers and the target number being the number of PUCCHs supported by the terminal;

a second grouping unit 4112, configured to, when the total number of all the downlink carriers is less than a second threshold, divide all the downlink carriers into the same group to obtain a second downlink carrier group, the first threshold being greater than the second threshold; and a third grouping unit 4113, configured to, when the total number of all the downlink carriers ranges from the second threshold to the first threshold, divide all the downlink carriers into the target number of third downlink carrier groups; a downlink carrier which is configured to carry target data with priority higher than predetermined priority may belong to at least two third downlink carrier groups.

In the embodiment, the base station may divide the downlink carriers into different downlink carrier groups according to the total number of the downlink carriers; when the total number of the downlink carriers is relatively large, non-overlapping grouping may be performed to obtain the target number of first downlink carrier groups; when the total number of the downlink carriers is relatively small, complete overlapping grouping may be performed to divide all the downlink carriers into a group, thereby obtaining the second downlink carrier group; and when the total number of the downlink carriers is proper, namely ranging from the second threshold to the first threshold, partial overlapping grouping may be performed to divide the downlink carriers carrying downlink data which have higher priority into at least two third downlink carrier groups. Through the process, it may be ensured that the HARQ results of the downlink data carried on all the downlink carriers in the downlink carrier groups are subsequently fed back through different target uplink carriers. When DC is implemented between the LTE system and the LAA system, reliability of a feedback on a HARQ result through a PUCCH in the LAA system can be improved.

Figure 13:
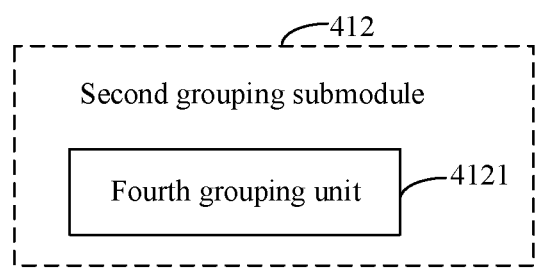
FIG. 13 is a block diagram of another device for feeding back a HARQ result according to an exemplary embodiment.

Referring to FIG. 13, FIG. 13 is a block diagram of another device for feeding back a HARQ result based on the embodiment shown in FIG. 11. The second grouping submodule 412 may include:

a fourth grouping unit 4121, configured to group all the uplink carriers to obtain the target number of uplink carrier groups, any two uplink carrier groups including different uplink carriers and the target number being the number of PUCCHs supported by the terminal.

In the embodiment, the base station may perform non-overlapping grouping on the uplink carriers to establish the mapping relationship between uplink carrier groups and downlink carrier groups, thereby achieving high applicability.

Figure 14:
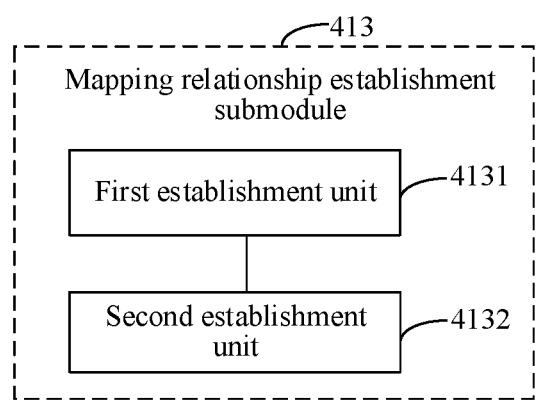
FIG. 14 is a block diagram of another device for feeding back a HARQ result according to an exemplary embodiment.

Referring to FIG. 14, FIG. 14 is a block diagram of another device for feeding back a HARQ result based on the embodiment shown in FIG. 12 or FIG. 13. The mapping relationship establishment submodule 413 may include:

a first establishment unit 4131, configured to, when the group number of the downlink carrier groups is the target number, establish a mapping relationship that each downlink carrier group corresponds to each uplink carrier group one to one; and a second establishment unit 4132, configured to, when the group number of the downlink carrier groups is 1, establish a mapping relationship that the downlink carrier group corresponds to each uplink carrier group.

In the embodiment, when the number of the downlink carrier groups is the target number, the mapping relationship that each downlink carrier group corresponds to each uplink carrier group one to one may be established; and when the number of the downlink carrier groups is 1, the mapping relationship that the downlink carrier group corresponds to each uplink carrier group may be established. When DC is implemented between the LTE system and the LAA system, if the base station fails in CRC over a certain PDCCH, only downlink data carried on all the downlink carriers in the downlink carrier group corresponding to the uplink carrier group is required to be retransmitted, so that the problem that massive downlink data has to be retransmitted because of a PUCCH CRC failure of the base station can be effectively alleviated, and reliability of a feedback on a HARQ result through a PUCCH in the LAA system can be improved.

Optionally, the target manner may include that:

an uplink carrier with highest channel quality in an idle channel in each uplink carrier group is determined as the target uplink carrier; or an uplink carrier is selected from each uplink carrier group as the target uplink carrier according to a sequence that is notified through signaling or is predefined.

In the embodiment, the base station may specify a target manner for acquiring a target uplink carrier for a terminal, and furthermore, the terminal may determine a target uplink carrier required to carry a target HARQ result in a present uplink carrier group according to the target manner specified by the base station. The uncertainty of channel availability when the PUCCH is configured on an unauthorized carrier can be effectively alleviated.

Figure 15:
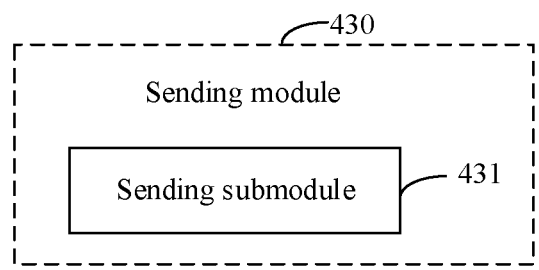
FIG. 15 is a block diagram of another device for feeding back a HARQ result according to an exemplary embodiment.

Referring to FIG. 15, FIG. 15 is a block diagram of another device for feeding back a HARQ result based on the embodiment shown in FIG. 10. The sending module 430 may include:

a sending submodule 431, configured to send the mapping relationship and the target manner to the terminal through target signaling, the target signaling including at least one of: RRC signaling, system information, a MAC CE and physical-layer signaling.

In the embodiment, the base station may send the mapping relationship and the target manner to the terminal through the target signaling, the target signaling including at least one of: the RRC signaling, the system information, the MAC CE and the physical-layer signaling. Convenience for implementation and high applicability are achieved.

Figure 16:
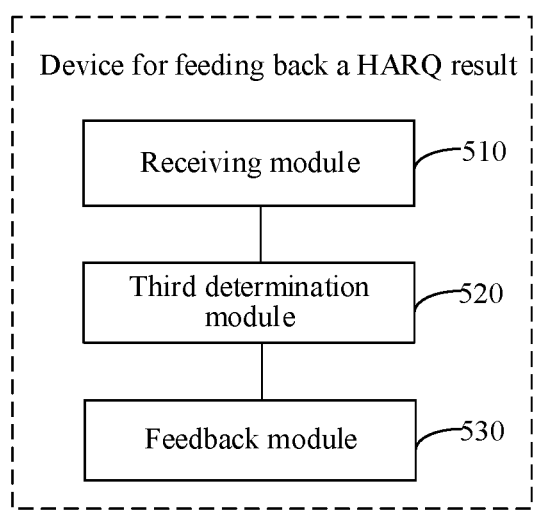
FIG. 16 is a block diagram of another device for feeding back a HARQ result according to an exemplary embodiment.

FIG. 16 is a block diagram of another device for feeding back a HARQ result according to an exemplary embodiment. The device is applied to a terminal. The device includes:

a receiving module 510, configured to receive a mapping relationship and a target manner from a base station, the mapping relationship being a mapping relationship between each downlink carrier group and each uplink carrier group and the target manner being a manner for acquiring a target uplink carrier from the each uplink carrier group;

a third determination module 520, configured to determine the target uplink carrier in a present uplink carrier group according to the target manner; and a feedback module 530, configured to feed back a target HARQ result through the target uplink carrier, each downlink carrier group may include at least one downlink carrier, each uplink carrier group may include at least one uplink carrier, the target uplink carrier may be an uplink carrier configured to carry a target HARQ result in a present uplink carrier group and the target HARQ result may include HARQ results of downlink data carried on all the downlink carriers in a downlink carrier group corresponding to the present uplink carrier group.

In the embodiment, the terminal, after receiving the mapping relationship and the target manner from the base station, may determine the target uplink carrier in the present uplink carrier group according to the target manner. Furthermore, the terminal may feed back the target HARQ result through the target uplink carrier. The mapping relationship may be a mapping relationship between each downlink carrier group and each uplink carrier group, and the target manner may be a manner for acquiring the target uplink carrier from the each uplink carrier group. Each downlink carrier group may include at least one downlink carrier, each uplink carrier group may include at least one uplink carrier, the target uplink carrier may be an uplink carrier configured to carry the target HARQ result in the present uplink carrier group, and the target HARQ result may include the HARQ results of the downlink data carried on all the downlink carriers in the downlink carrier group corresponding to the present uplink carrier group. Through the process, when DC is implemented between an LTE system and an LAA system, if the base station fails in CRC over a certain PDCCH, only downlink data carried on all the downlink carriers in the downlink carrier group corresponding to the uplink carrier group is required to be retransmitted, so that the problem that massive data has to be retransmitted because of a PUCCH CRC failure of the base station can be effectively alleviated, and reliability of a feedback on a HARQ result through a PUCCH in the LAA system can be improved.

Optionally, the target manner may include that:

an uplink carrier with highest channel quality in an idle channel in each uplink carrier group is determined as the target uplink carrier; or an uplink carrier is selected from each uplink carrier group as the target uplink carrier according to a sequence that is notified through signaling or is predefined.

Figure 17:
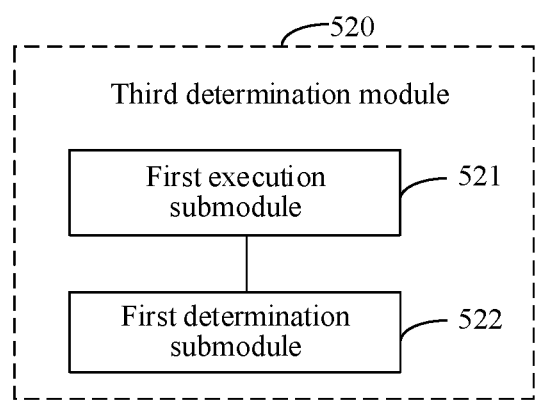
FIG. 17 is a block diagram of another device for feeding back a HARQ result according to an exemplary embodiment.

Referring to FIG. 17, FIG. 17 is a block diagram of another device for feeding back a HARQ result based on the embodiment shown in FIG. 16. The third determination module 520 may include:

a first execution submodule 521, configured to, in a case that the target manner is that the uplink carrier with the highest channel quality in the idle channel in each uplink carrier group is determined as the target uplink carrier, perform LBT on each uplink carrier in the present uplink carrier group to obtain an LBT result; and a first determination submodule 522, configured to select the uplink carrier with the highest channel quality in the idle channel from the present uplink carrier group as the target uplink carrier according to the LBT result.

Figure 18:
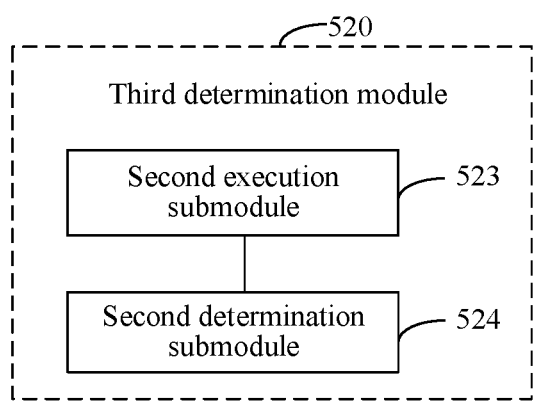
FIG. 18 is a block diagram of another device for feeding back a HARQ result according to an exemplary embodiment.

Referring to FIG. 18, FIG. 18 is a block diagram of another device for feeding back a HARQ result based on the embodiment shown in FIG. 16. The third determination module 520 may include:

a second execution submodule 523, configured to, in a case that the target manner is that the uplink carrier is selected from each uplink carrier group as the target uplink carrier according to the sequence that is notified through the signaling or is predefined, number all the uplink carriers in the present uplink carrier group according to a sequence from smallest to largest; and a second determination submodule 524, configured to determine a first uplink carrier of which the LBT result is success as the target uplink carrier according to numbers of all the uplink carriers.

In the embodiment, the target manner provided for the terminal by the base station may include that: an uplink carrier with the highest channel quality in the idle channel in each uplink carrier group is determined as the target uplink carrier; or an uplink carrier is selected from each uplink carrier group as the target uplink carrier according to the sequence that is notified through the signaling or is predefined. The terminal may perform LBT on each uplink carrier in the present uplink carrier group according to the target manner to obtain an LBT result, thereby selecting the uplink carrier with the highest channel quality in the idle channel as the target uplink carrier according to the LBT result. Or, all the uplink carriers in the present uplink carrier group may be numbered according to the sequence from smallest to largest, and a first uplink carrier of which the LBT result is success may be determined as the target uplink carrier according to the sequencing numbers. Through the process, the terminal may select the target uplink carrier according to the LBT result, so that the problem of channel availability uncertainty when the PUCCH is configured on an unauthorized carrier can be effectively alleviated, and reliability of a feedback on a HARQ result can be improved.

The device embodiments substantially correspond to the method embodiments, and thus the related parts may refer to part of descriptions of the method embodiments. The device embodiments described above are only schematic, units described as separate parts therein can be physically separated or not; and parts displayed as units can be physical units or not, which namely may be located in the same place or may be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a computer-readable storage medium, which can have a computer program stored thereon for executing any method for feeding back a HARQ result applied to a base station side.

Correspondingly, the present disclosure also provides a computer-readable storage medium, which can have a computer program stored thereon for executing any method for feeding back a HARQ result applied to a terminal side.

Correspondingly, the present disclosure also provides a device for feeding back a HARQ result, which is applied to a base station and includes:

a processor; and a memory configured to store an instruction executable for the processor, wherein the processor is configured to:

determine a mapping relationship between each downlink carrier group and each uplink carrier group, each downlink carrier group including at least one downlink carrier and each uplink carrier group including at least one uplink carrier;

determine a target manner for acquiring a target uplink carrier from the each uplink carrier group, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and send the mapping relationship and the target manner to a terminal to enable the terminal to feed back the target HARQ result through the target uplink carrier after determining the target uplink carrier in the present uplink carrier group according to the target manner.

Figure 19:
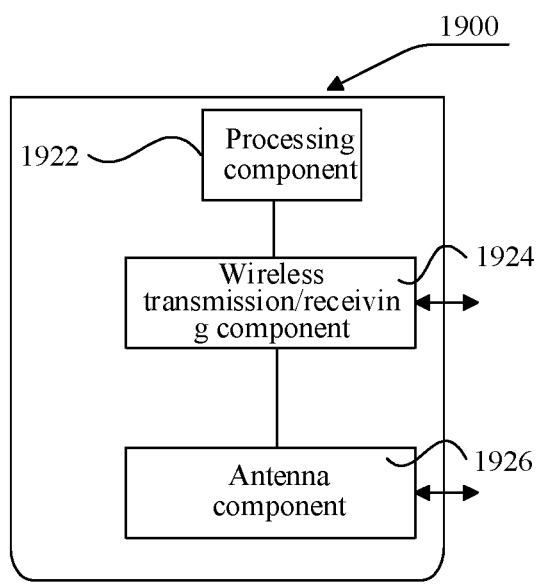
FIG. 19 is a structure diagram of a device for feeding back a HARQ result according to an exemplary embodiment of the present disclosure.

As shown in FIG. 19, FIG. 19 is a structure diagram of a device 1900 for feeding back a HARQ result according to an exemplary embodiment of the present disclosure. The device 1900 may be provided as a base station. Referring to FIG. 19, the device 1900 includes a processing component 1922, a wireless transmission/receiving component 1924, an antenna component 1926 and a wireless interface-specific signal processing part, and the processing component 1922 may further include one or more processors.

One processor in the processing component 1922 may be configured to:

determine a mapping relationship between each downlink carrier group and each uplink carrier group, each downlink carrier group including at least one downlink carrier and each uplink carrier group including at least one uplink carrier;

determine a target manner for acquiring a target uplink carrier from the each uplink carrier group, the target uplink carrier being an uplink carrier configured to carry a target HARQ result in a present uplink carrier group and the target HARQ result including HARQ results of downlink data carried on all the downlink carriers in a downlink carrier group corresponding to the present uplink carrier group; and send the mapping relationship and the target manner to a terminal to enable the terminal to feed back the target HARQ result through the target uplink carrier after determining the target uplink carrier in the present uplink carrier group according to the target manner.

Correspondingly, the present disclosure also provides a device for feeding back a HARQ result, which is applied to a terminal and includes:

a processor; and a memory configured to store an instruction executable for the processor, wherein the processor is configured to:

receive a mapping relationship and a target manner from a base station, the mapping relationship being a mapping relationship between each downlink carrier group and each uplink carrier group, and the target manner being a manner for acquiring a target uplink carrier from the each uplink carrier group;

determine the target uplink carrier in a present uplink carrier group according to the target manner; and feed back a target HARQ result through the target uplink carrier, each downlink carrier group including at least one downlink carrier, each uplink carrier group including at least one uplink carrier, the target uplink carrier being an uplink carrier configured to carry the target HARQ result in the present uplink carrier group and the target HARQ result including HARQ results of downlink data carried on all the downlink carriers in a downlink carrier group corresponding to the present uplink carrier group.

Figure 20:
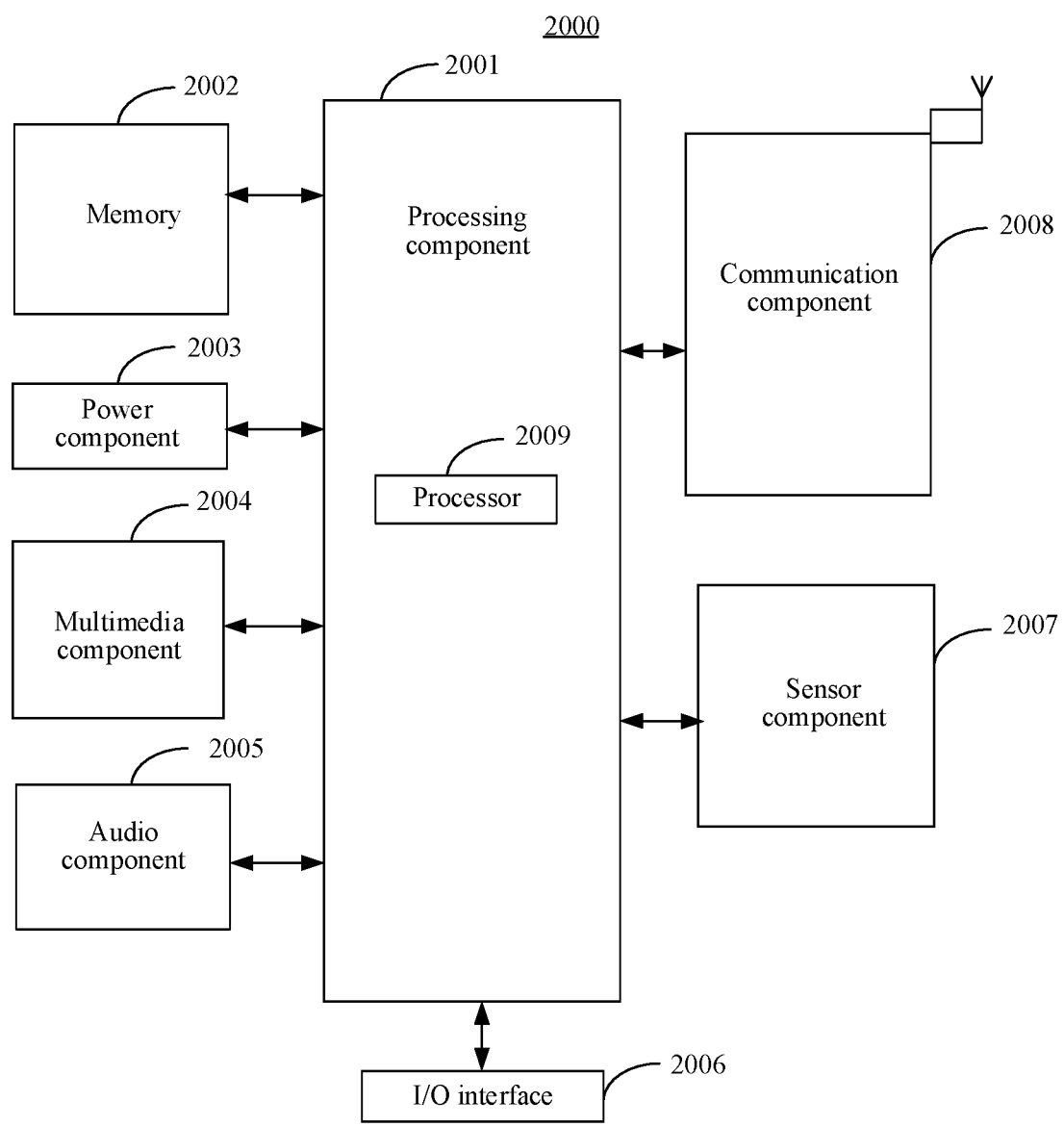
FIG. 20 is a structure diagram of another device for feeding back a HARQ result according to an exemplary embodiment of the present disclosure.

FIG. 20 is a structure diagram of a device for feeding back a HARQ result according to an exemplary embodiment. FIG. 20 illustrates a device 2000 for feeding back a HARQ result according to an exemplary embodiment. The device 2000 may be a terminal such as a computer, a mobile phone, a digital broadcast terminal, a messaging device, a gaming console, a tablet, a medical device, exercise equipment and a personal digital assistant.

Referring to FIG. 20, the device 2000 may include one or more of the following components: a processing component 2001, a memory 2002, a power component 2003, a multimedia component 2004, an audio component 2005, an Input/Output (I/O) interface 2006, a sensor component 2007, and a communication component 2008.

The processing component 2001 is typically configured to control overall operations of the device 2000, such as the operations associated with display, telephone calls, data communications, camera operations, and recording operations. The processing component 2001 may include one or more processors 2009 to execute instructions to perform all or part of the steps in the abovementioned method. Moreover, the processing component 2001 may include one or more modules which facilitate interaction between the processing component 2001 and other components. For instance, the processing component 2001 may include a multimedia module to facilitate interaction between the multimedia component 2004 and the processing component 2001.

The memory 2002 is configured to store various types of data to support the operation of the device 2000. Examples of such data may include instructions for any application programs or methods operated on the device 2000, contact data, phonebook data, messages, pictures, video, etc. The memory 2002 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2003 may provide power for various components of the device 2000. The power component 2003 may include a power management system, one or more power supplies, and other components associated with generation, management and distribution of power for the device 2000.

The multimedia component 2004 may include a screen providing an output interface between the device 2000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors cannot only sense a boundary of a touch or swipe action but also detect a duration and pressure associated with the touch or swipe action. In some embodiments, the multimedia component 2004 includes a front camera and/or a rear camera. The front camera and/or the rear camera may receive external multimedia data when the device 2000 is in an operation mode, such as a photographing mode or a video mode. Each of the front camera and the rear camera may be a fixed optical lens system or have focusing and optical zooming capabilities.

The audio component 2005 is configured to output and/or input an audio signal. For example, the audio component 2005 includes a Microphone (MIC), and the MIC is configured to receive an external audio signal when the device 2000 is in the operation mode, such as a call mode, a recording mode and a voice recognition mode. The received audio signal may further be stored in the memory 2002 or sent through the communication component 2008. In some embodiments, the audio component 2005 further includes a speaker configured to output the audio signal.

The I/O interface 2006 may provide an interface between the processing component 2001 and a peripheral interface module, and the peripheral interface module may be a keyboard, a click wheel, a button and the like. The button may include, but not limited to: a home button, a volume button, a starting button and a locking button.

The sensor component 2007 may include one or more sensors configured to provide status assessment in various aspects for the device 2000. For instance, the sensor component 2007 may detect an on/off status of the device 2000 and relative positioning of components, such as a display and small keyboard of the device 2000, and the sensor component 2007 may further detect a change in a position of the device 2000 or a component of the device 2000, presence or absence of contact between the user and the device 2000, orientation or acceleration/deceleration of the device 2000 and a change in temperature of the device 2000. The sensor component 2007 may include a proximity sensor configured to detect presence of an object nearby without any physical contact. The sensor component 2007 may also include a light sensor, such as a Complementary Metal Oxide Semiconductor (CMOS) or Charge Coupled Device (CCD) image sensor, configured for use in an imaging application. In some embodiments, the sensor component 2007 may also include an acceleration sensor, a gyroscope sensor, a magnetic sensor, a pressure sensor or a temperature sensor.

The communication component 2008 is configured to facilitate wired or wireless communication between the device 2000 and another device. The device 2000 may access a communication-standard-based wireless network, such as a Wireless Fidelity (WiFi) network, a 2nd-Generation (2G) or 3rd-Generation (3G) network or a combination thereof. In an exemplary embodiment, the communication component 2008 receives a broadcast signal or broadcast associated information from an external broadcast management system through a broadcast channel. In an exemplary embodiment, the communication component 2008 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 2000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 2002 including instructions, and the instructions may be executed by the processor 2009 of the device 2000 to implement the abovementioned method. For example, the non-transitory computer-readable storage medium may be a Read-Only Memory (ROM), a Random-Access Memory (RAM), a Compact Disc Read-Only Memory (CD-ROM), a magnetic tape, a floppy disc, an optical data storage device and the like.

The instructions in the storage medium may be executed by the processor to enable the device 2000 to implement any method for feeding back a HARQ result on a terminal side.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for feeding back a Hybrid Automatic Repeat reQuest (HARQ) result, implemented by a base station and comprising:
    determining a mapping relationship between each downlink carrier group and each uplink carrier group, the each downlink carrier group comprising at least one downlink carrier and the each uplink carrier group comprising at least one uplink carrier;
    determining a target manner for acquiring a target uplink carrier from the each uplink carrier group, wherein the target uplink carrier is an uplink carrier configured to carry a target HARQ result in a present uplink carrier group and the target HARQ result comprises HARQ results of downlink data carried on all the downlink carriers in a downlink carrier group corresponding to the present uplink carrier group; and
    sending the mapping relationship and the target manner to a terminal to enable the terminal to feed back the target HARQ result through the target uplink carrier after determining the target uplink carrier in the present uplink carrier group according to the target manner,
    wherein determining the mapping relationship between the each downlink carrier group and the each uplink carrier group comprises:
    grouping all downlink carriers to obtain multiple downlink carrier groups;
    grouping all uplink carriers to obtain multiple uplink carrier groups; and
    establishing the mapping relationship between the each downlink carrier group and the each uplink carrier group,
    wherein grouping all the downlink carriers to obtain the multiple downlink carrier groups comprises:
    when a total number of all the downlink carriers exceeds a first threshold, dividing all the downlink carriers into a target number of first downlink carrier groups, wherein any two first downlink carrier groups comprises different downlink carriers and the target number is the number of Physical Uplink Control Channels (PUCCHs) supported by the terminal;
    when the total number of all the downlink carriers is less than a second threshold, dividing all the downlink carriers into a same group to obtain a second downlink carrier group, the first threshold being greater than the second threshold; and
    when the total number of all the downlink carriers ranges from the second threshold to the first threshold, dividing all the downlink carriers into a target number of third downlink carrier groups, wherein a downlink carrier configured to carry target data with priority higher than predetermined priority belongs to at least two third downlink carrier groups.

2. The method of claim 1, wherein
    grouping all the downlink carriers to obtain the multiple downlink carrier groups comprises:
    grouping all the uplink carriers to obtain the multiple uplink carrier groups comprises:
    grouping all the uplink carriers to obtain a target number of uplink carrier groups, wherein any two uplink carrier groups comprises different uplink carriers and the target number is the number of PUCCHs supported by the terminal.

3. The method of claim 1, wherein establishing the mapping relationship between the each downlink carrier group and the each uplink carrier group comprises:
    when a group number of the downlink carrier groups is the target number, establishing the mapping relationship that the each downlink carrier group corresponds to the each uplink carrier group one to one; and
    when the group number of the downlink carrier groups is 1, establishing the mapping relationship that the downlink carrier group corresponds to the each uplink carrier group.

4. The method of claim 1, wherein the target manner comprises that:
    an uplink carrier with highest channel quality in an idle channel in the each uplink carrier group is determined as the target uplink carrier; or
    an uplink carrier is selected from the each uplink carrier group as the target uplink carrier according to a sequence that is notified through signaling or is predefine.

5. The method of claim 1, wherein sending the mapping relationship and the target manner to the terminal comprises:
    sending the mapping relationship and the target manner to the terminal through target signaling, the target signaling comprising at least one of:
    Radio Resource Control (RRC) signaling, system information, a Media Access Control (MAC) Control Element (CE), and physical-layer signaling.

6. A non-transitory computer-readable storage medium, having a computer program stored thereon for executing the method for feeding back a Hybrid Automatic Repeat reQuest (HARQ) result of claim 1.

7. A communication system implementing the method of claim 1, comprising the base station and the terminal, wherein:
    Dual Connectivity (DC) is implemented between a Long-Term Evolution (LTE) system and a License Assisted Access (LAA) system;
    upon that the base station fails in Cyclic Redundancy Check (CRC) over a Physical Downlink Control Channel (PDCCH), only downlink data carried on all the downlink carriers in the downlink carrier group corresponding to the uplink carrier group are retransmitted, so as to reduce downlink data retransmitted during a Physical Uplink Control Channel (PUCCH) CRC failure of the base station, and improve reliability of a feedback on a HARQ result through the PUCCH in the LAA system.

8. A method for feeding back a Hybrid Automatic Repeat reQuest (HARQ) result, implemented by a terminal and comprising:
    receiving a mapping relationship and a target manner from a base station, the mapping relationship being a mapping relationship between each downlink carrier group and each uplink carrier group and the target manner being a manner for acquiring a target uplink carrier from the each uplink carrier group;
    determining the target uplink carrier in a present uplink carrier group according to the target manner; and
    feeding back a target HARQ result through the target uplink carrier,
    wherein the each downlink carrier group comprises at least one downlink carrier, the each uplink carrier group comprises at least one uplink carrier, the target uplink carrier is an uplink carrier configured to carry the target HARQ result in the present uplink carrier group and the target HARQ result comprises HARQ results of downlink data carried on all the downlink carriers in a downlink carrier group corresponding to the present uplink carrier group, wherein the method further comprises:
when a total number of all the downlink carriers exceeds a first threshold, determining that the downlink carrier group comprises a target number of first downlink carrier groups, wherein any two first downlink carrier groups comprises different downlink carriers and the target number is the number of Physical Uplink Control Channels (PUCCHs) supported by the terminal;
when the total number of all the downlink carriers is less than a second threshold, determining that the downlink carrier group comprises a second downlink carrier group, the first threshold being greater than the second threshold; and
when the total number of all the downlink carriers ranges from the second threshold to the first threshold, determining that the downlink carrier group comprises a target number of third downlink carrier groups, wherein a downlink carrier configured to carry target data with priority higher than predetermined priority belongs to at least two third downlink carrier groups.

9. The method of claim 8, wherein the target manner comprises that:
an uplink carrier with highest channel quality in an idle channel in the each uplink carrier group is determined as the target uplink carrier; or
an uplink carrier is selected from the each uplink carrier group as the target uplink carrier according to a sequence that is notified through signaling or is predefined.

10. The method of claim 9, wherein determining the target uplink carrier in the present uplink carrier group according to the target manner comprises:
in a case that the target manner is that the uplink carrier with the highest channel quality in the idle channel in the each uplink carrier group is determined as the target uplink carrier,
performing Listen Before Talk (LBT) on each uplink carrier in the present uplink carrier group to obtain an LBT result; and
selecting the uplink carrier with the highest channel quality in the idle channel from the present uplink carrier group as the target uplink carrier according to the LBT result;
or,
in a case that the target manner is that the uplink carrier is selected from the each uplink carrier group as the target uplink carrier according to the sequence that is notified through the signaling or is predefined,
numbering all the uplink carriers in the present uplink carrier group according to a sequence from smallest to largest; and
determining a first uplink carrier of which an LBT result is success as the target uplink carrier according to numbers of all the uplink carriers.

11. A device implemented by a base station and comprising a processing component and a wireless transmission/receiving component, wherein:
the processing component is configured to:
determine a mapping relationship between each downlink carrier group and each uplink carrier group, each downlink carrier group comprising at least one downlink carrier and each uplink carrier group comprising at least one uplink carrier; and
determine a target manner for acquiring a target uplink carrier from the each uplink carrier group, the target uplink carrier being an uplink carrier configured to carry a target HARQ result in a present uplink carrier group and the target HARQ result comprising HARQ results of downlink data carried on all the downlink carriers in a downlink carrier group corresponding to the present uplink carrier group; and
the wireless transmission/receiving component is configured to send the mapping relationship and the target manner to a terminal to enable the terminal to feed back the target HARQ result through the target uplink carrier after determining the target uplink carrier in the present uplink carrier group according to the target manner,
wherein the processing component is further configured to:
group all downlink carriers to obtain multiple downlink carrier groups;
group all uplink carriers to obtain multiple uplink carrier groups; and
establish the mapping relationship between the each downlink carrier group and the each uplink carrier group,
wherein the processing component is further configured to:
when a total number of all the downlink carriers exceeds a first threshold, divide all the downlink carriers into a target number of first downlink carrier groups, wherein any two first downlink carrier groups comprises different downlink carriers and the target number is the number of Physical Uplink Control Channels (PUCCHs) supported by the terminal;
when the total number of all the downlink carriers is less than a second threshold, divide all the downlink carriers into a same group to obtain a second downlink carrier group, the first threshold being greater than the second threshold; and
when the total number of all the downlink carriers ranges from the second threshold to the first threshold, divide all the downlink carriers into a target number of third downlink carrier groups, wherein a downlink carrier configured to carry target data with priority higher than predetermined priority belongs to at least two third downlink carrier groups.

12. The device of claim 11, wherein
the processing component is further configured to:
the processing component is further configured to group all the uplink carriers to obtain a target number of uplink carrier groups, any two uplink carrier groups comprising different uplink carriers and the target number being the number of PUCCHs supported by the terminal.

13. The device of claim 11, wherein the processing component is further configured to:
when a group number of the downlink carrier groups is the target number, establish the mapping relationship that the each downlink carrier group corresponds to the each uplink carrier group one to one; and
when the group number of the downlink carrier groups is 1, establish the mapping relationship that the downlink carrier group corresponds to the each uplink carrier group.

14. The device of claim 11, wherein the target manner comprises that:
an uplink carrier with highest channel quality in an idle channel in each uplink carrier group is determined as the target uplink carrier; or
an uplink carrier is selected from the each uplink carrier group as the target uplink carrier according to a sequence that is notified through signaling or is predefined.

15. The device of claim 11, wherein the wireless transmission/receiving component is further configured to:
  send the mapping relationship and the target manner to the terminal through target signaling, the target signaling comprising at least one of:
  Radio Resource Control (RRC) signaling, system information, a Media Access Control (MAC) Control Element (CE), and physical-layer signaling.

16. A terminal device, at least comprising a processing component and a communication component, wherein:
  the communication component is configured to receive a mapping relationship and a target manner from a base station, the mapping relationship being a mapping relationship between each downlink carrier group and each uplink carrier group and the target manner being a manner for acquiring a target uplink carrier from the each uplink carrier group;
  the processing component is configured to determine the target uplink carrier in a present uplink carrier group according to the target manner; and
  the communication component is further configured to feed back a target HARQ result through the target uplink carrier,
  wherein the each downlink carrier group comprises at least one downlink carrier, the each uplink carrier group comprises at least one uplink carrier, the target uplink carrier is an uplink carrier configured to carry the target HARQ result in the present uplink carrier group and the target HARQ result comprises HARQ results of downlink data carried on all the downlink carriers in a downlink carrier group corresponding to the present uplink carrier group,
  wherein the processing component is further configured to:
  when a total number of all the downlink carriers exceeds a first threshold, determine that the downlink carrier group comprises a target number of first downlink carrier groups, wherein any two first downlink carrier groups comprises different downlink carriers and the target number is the number of Physical Uplink Control Channels (PUCCHs) supported by the terminal;
  when the total number of all the downlink carriers is less than a second threshold, determine that the downlink carrier group comprises a second downlink carrier group, the first threshold being greater than the second threshold; and
  when the total number of all the downlink carriers ranges from the second threshold to the first threshold, determine that the downlink carrier group comprises a target number of third downlink carrier groups, wherein a downlink carrier configured to carry target data with priority higher than predetermined priority belongs to at least two third downlink carrier groups.

17. The device of claim 16, wherein the target manner comprises that:
  an uplink carrier with highest channel quality in an idle channel in the each uplink carrier group is determined as the target uplink carrier; or
  an uplink carrier is selected from the each uplink carrier group as the target uplink carrier according to a sequence that is notified through signaling or is predefined.

18. The device of claim 17, wherein the processing component is further configured to:
  in a case that the target manner is that the uplink carrier with the highest channel quality in the idle channel in the each uplink carrier group is determined as the target uplink carrier, perform Listen Before Talk (LBT) on each uplink carrier in the present uplink carrier group to obtain an LBT result; and
  select the uplink carrier with the highest channel quality in the idle channel from the present uplink carrier group as the target uplink carrier according to the LBT result; or,
  in a case that the target manner is that the uplink carrier is selected from the each uplink carrier group as the target uplink carrier according to the sequence that is notified through the signaling or is predefined, number all the uplink carriers in the present uplink carrier group according to a sequence from smallest to largest; and
  determine a first uplink carrier of which an LBT result is success as the target uplink carrier according to numbers of all the uplink carriers.

* * * * *